United States Patent
Vanier et al.

(10) Patent No.: US 12,421,118 B2
(45) Date of Patent: Sep. 23, 2025

(54) GRAPHENIC CARBON PARTICLES

(71) Applicant: PPG Industries Ohio, Inc., Cleveland, OH (US)

(72) Inventors: Noel R. Vanier, Wexford, PA (US); Cheng-Hung Hung, Wexford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 16/416,359

(22) Filed: May 20, 2019

(65) Prior Publication Data

US 2019/0300370 A1 Oct. 3, 2019

Related U.S. Application Data

(63) Continuation-in-part of application No. 14/432,129, filed as application No. PCT/US2013/062306 on Sep. 27, 2013, now Pat. No. 10,294,375, which is a continuation-in-part of application No. PCT/US2012/057811, filed on Sep. 28, 2012, which is a continuation-in-part of application No. 13/309,894, filed on Dec. 2, 2011, now Pat. No. 8,486,364, which is a continuation-in-part of
(Continued)

(51) Int. Cl.
C01B 32/184 (2017.01)

(52) U.S. Cl.
CPC ........ *C01B 32/184* (2017.08); *C01B 2204/04* (2013.01); *C01B 2204/32* (2013.01); *C01P 2002/82* (2013.01); *C01P 2004/64* (2013.01)

(58) Field of Classification Search
CPC .............. C01B 32/184; C01B 2204/04; C01B 2204/32; C01P 2002/82; C01P 2004/64
See application file for complete search history.

(56) References Cited

U.S. PATENT DOCUMENTS

| | | |
|---|---|---|
| 3,455,806 A | 7/1969 | Spoor et al. |
| 3,869,366 A | 3/1975 | Suzuki et al. |
| 4,452,963 A | 6/1984 | Moriarity |

(Continued)

FOREIGN PATENT DOCUMENTS

| | | |
|---|---|---|
| CN | 1391705 A | 1/2003 |
| CN | 101974266 | 2/2011 |

(Continued)

OTHER PUBLICATIONS

Bergeron "Production of Carbon by Pyrolysis of Methane in Thermal Plasma", Master's Thesis is Applied Sciences, University of Sherbrooke, Faculty of Applied Sciences, Department of Chemical Enginering, Quebec, Canada, Oct. 1997.
(Continued)

*Primary Examiner* — Travis M Figg
(74) *Attorney, Agent, or Firm* — Krisanne Shideler

(57) ABSTRACT

Graphenic carbon particles having controlled aspect ratios, surface areas, numbers of carbon atom layers, and Raman spectroscopy peak ratios are disclosed. The graphenic carbon particles may include three or more stacked carbon atom layers, and may have a Raman spectroscopy 2D/G peak ratio of at least 1:1. Adjacent carbon atom layers within each graphenic carbon particle may be slightly misaligned with respect to each other to form a turbostatic structure.

14 Claims, 19 Drawing Sheets

Related U.S. Application Data application No. 13/249,315, filed on Sep. 30, 2011, now Pat. No. 8,486,363.

(60) Provisional application No. 61/794,586, filed on Mar. 15, 2013.

(56) References Cited

U.S. PATENT DOCUMENTS

| | | | |
|---|---|---|---|
| 4,851,262 | A | 7/1989 | McFeaters |
| 5,114,477 | A | 5/1992 | Mort et al. |
| 5,486,675 | A | 1/1996 | Taylor et al. |
| 5,527,518 | A | 6/1996 | Ynum et al. |
| 5,749,937 | A | 5/1998 | Detering et al. |
| 5,763,548 | A | 6/1998 | Matyjaszewski et al. |
| 5,788,738 | A | 8/1998 | Pirzada et al. |
| 5,789,487 | A | 8/1998 | Matyjaszewski et al. |
| 5,807,937 | A | 9/1998 | Matyjaszewski et al. |
| 5,837,766 | A | 11/1998 | Metro et al. |
| 5,851,507 | A | 12/1998 | Pirzada et al. |
| 5,935,293 | A | 8/1999 | Detering et al. |
| 5,984,997 | A | 11/1999 | Bickmore et al. |
| 5,989,648 | A | 11/1999 | Phillips |
| 6,099,696 | A | 8/2000 | Schwob et al. |
| 6,228,904 | B1 | 5/2001 | Yadav et al. |
| 6,316,119 | B1 | 11/2001 | Metzger et al. |
| 6,358,375 | B1 | 3/2002 | Schwob |
| 6,441,066 | B1 | 8/2002 | Woodworth et al. |
| 6,642,301 | B2 | 11/2003 | White et al. |
| 6,652,967 | B2 | 11/2003 | Yadav et al. |
| 6,669,823 | B1 | 12/2003 | Sarkas et al. |
| 6,689,192 | B1 | 2/2004 | Phillips et al. |
| 6,710,116 | B1 | 3/2004 | Waddell et al. |
| 6,716,525 | B1 | 4/2004 | Yadav et al. |
| 6,719,821 | B2 | 4/2004 | Yadav et al. |
| 6,786,950 | B2 | 9/2004 | Yadav et al. |
| 6,821,500 | B2 | 11/2004 | Fincke et al. |
| 6,830,822 | B2 | 12/2004 | Yadav |
| 6,849,109 | B2 | 2/2005 | Yadav et al. |
| 6,855,273 | B2 | 2/2005 | Ravet et al. |
| 7,071,258 | B1 | 7/2006 | Jang et al. |
| 7,285,201 | B2 | 10/2007 | Emmonds et al. |
| 7,508,650 | B1 | 3/2009 | Bluvstein et al. |
| 7,623,340 | B1 | 11/2009 | Song et al. |
| 7,632,538 | B2 | 12/2009 | Veerasamy |
| 7,635,458 | B1 | 12/2009 | Hung et al. |
| 7,754,184 | B2 | 7/2010 | Mercuri |
| 7,776,303 | B2 | 8/2010 | Hung et al. |
| 7,785,492 | B1 | 8/2010 | Jang et al. |
| 7,790,285 | B2 | 9/2010 | Zhamu et al. |
| 7,824,741 | B2 | 11/2010 | Sandhu |
| 7,828,619 | B1 | 11/2010 | Yeh |
| 7,842,271 | B2 | 11/2010 | Petrik |
| 7,852,613 | B2 | 12/2010 | Ma et al. |
| 7,948,739 | B2 | 5/2011 | Zhamu et al. |
| 8,047,248 | B2 | 11/2011 | Prud'homme et al. |
| 8,048,950 | B2 | 11/2011 | Prud'homme et al. |
| 8,083,970 | B2 | 12/2011 | Ma et al. |
| 8,129,466 | B2 | 3/2012 | Polk et al. |
| 8,168,058 | B2 | 5/2012 | Ho et al. |
| 8,211,601 | B2 | 7/2012 | Yu et al. |
| 8,237,538 | B2 | 8/2012 | Braun et al. |
| 8,247,116 | B2 | 8/2012 | He et al. |
| 8,372,257 | B2 | 2/2013 | Fujii et al. |
| 8,486,363 | B2 | 7/2013 | Hung et al. |
| 8,486,364 | B2 | 7/2013 | Vanier et al. |
| 8,691,441 | B2 | 4/2014 | Zhamu et al. |
| 9,039,938 | B2 | 5/2015 | Crain et al. |
| 9,221,688 | B2 | 12/2015 | Hung et al. |
| 9,546,092 | B2 | 1/2017 | Aksay et al. |
| 9,574,094 | B2 | 2/2017 | Decker et al. |
| 9,647,263 | B2 | 5/2017 | Green |
| 9,653,733 | B2 | 5/2017 | Hochgatterer et al. |
| 10,294,375 | B2 | 5/2019 | Asay et al. |
| 10,763,490 | B2 | 9/2020 | Daughenbaugh et al. |
| 2002/0071915 | A1 | 6/2002 | Schubert et al. |
| 2002/0114949 | A1 | 8/2002 | Bower et al. |
| 2002/0151604 | A1 | 10/2002 | Detering et al. |
| 2002/0182506 | A1 | 12/2002 | Cagle |
| 2003/0032716 | A1 | 2/2003 | White et al. |
| 2003/0151032 | A1 | 8/2003 | Ito et al. |
| 2004/0247515 | A1 | 12/2004 | Gardner |
| 2005/0143327 | A1 | 6/2005 | Hirsch |
| 2005/0271574 | A1 | 12/2005 | Jang et al. |
| 2005/0272214 | A1 | 12/2005 | Chiang et al. |
| 2006/0093885 | A1 | 5/2006 | Krusic et al. |
| 2006/0121279 | A1 | 6/2006 | Petrik |
| 2006/0216222 | A1 | 9/2006 | Jang |
| 2006/0225615 | A1 | 10/2006 | Raman et al. |
| 2007/0015873 | A1 | 1/2007 | Fenn |
| 2007/0045116 | A1 | 3/2007 | Hung et al. |
| 2007/0096066 | A1 | 5/2007 | Yoshida et al. |
| 2007/0237705 | A1 | 10/2007 | Itoh et al. |
| 2007/0258189 | A1 | 11/2007 | Tano et al. |
| 2008/0081256 | A1 | 4/2008 | Madou et al. |
| 2008/0089013 | A1 | 4/2008 | Zhong et al. |
| 2008/0149900 | A1 | 6/2008 | Jang et al. |
| 2008/0188610 | A1 | 8/2008 | Polk et al. |
| 2008/0206124 | A1 | 8/2008 | Jang et al. |
| 2008/0220176 | A1 | 9/2008 | Carlblom et al. |
| 2009/0022649 | A1 | 1/2009 | Zhamu et al. |
| 2009/0054581 | A1 | 2/2009 | Prud'Homme et al. |
| 2009/0061194 | A1 | 3/2009 | Green et al. |
| 2009/0068471 | A1 | 3/2009 | Choi et al. |
| 2009/0075035 | A1 | 3/2009 | O'Brien et al. |
| 2009/0104427 | A1 | 4/2009 | Wan et al. |
| 2009/0110627 | A1 | 4/2009 | Choi et al. |
| 2009/0117467 | A1 | 5/2009 | Zhamu et al. |
| 2009/0169467 | A1 | 7/2009 | Zhamu et al. |
| 2009/0272946 | A1 | 11/2009 | Lu |
| 2010/0000441 | A1 | 1/2010 | Jang et al. |
| 2010/0035093 | A1 | 2/2010 | Ruoff et al. |
| 2010/0036023 | A1 | 2/2010 | Weng et al. |
| 2010/0047154 | A1 | 2/2010 | Lee et al. |
| 2010/0055017 | A1 | 3/2010 | Vanier et al. |
| 2010/0055025 | A1 | 3/2010 | Jang et al. |
| 2010/0072430 | A1 | 3/2010 | Gergely et al. |
| 2010/0096597 | A1 | 4/2010 | Prud'Homme et al. |
| 2010/0126660 | A1 | 5/2010 | O'Hara |
| 2010/0143798 | A1 | 6/2010 | Zhamu et al. |
| 2010/0247801 | A1 | 9/2010 | Zenasni |
| 2010/0255219 | A1 | 10/2010 | Wenxu et al. |
| 2010/0300358 | A1 | 12/2010 | Smiljanic et al. |
| 2010/0301212 | A1 | 12/2010 | Dato et al. |
| 2010/0303706 | A1 | 12/2010 | Wallace et al. |
| 2010/0314788 | A1 | 12/2010 | Hung et al. |
| 2010/0323113 | A1 | 12/2010 | Ramappa et al. |
| 2011/0046289 | A1 | 2/2011 | Zhamu et al. |
| 2011/0070426 | A1 | 3/2011 | Vanier et al. |
| 2011/0086206 | A1 | 4/2011 | Scheffer et al. |
| 2011/0088931 | A1 | 4/2011 | Lettow et al. |
| 2011/0101554 | A1 | 5/2011 | Krishnaiah et al. |
| 2011/0108609 | A1* | 5/2011 | Woo ............ B82Y 30/00 204/192.15 |
| 2011/0186786 | A1 | 8/2011 | Scheffer et al. |
| 2011/0244210 | A1 | 10/2011 | Choi et al. |
| 2011/0292570 | A1 | 12/2011 | Ivanovici et al. |
| 2012/0012796 | A1 | 1/2012 | Chen et al. |
| 2012/0026643 | A1 | 2/2012 | Yu et al. |
| 2012/0028127 | A1 | 2/2012 | Wei et al. |
| 2012/0058397 | A1 | 3/2012 | Zhamu et al. |
| 2012/0064409 | A1 | 3/2012 | Zhamu et al. |
| 2012/0068160 | A1 | 3/2012 | Yamazaki et al. |
| 2012/0073971 | A1 | 3/2012 | Prieto et al. |
| 2012/0114551 | A1 | 5/2012 | Coleman |
| 2012/0128570 | A1 | 5/2012 | Krishnaiah et al. |
| 2012/0129980 | A1 | 5/2012 | Desai et al. |
| 2012/0132849 | A1 | 5/2012 | Fan |
| 2012/0142832 | A1 | 6/2012 | Varma et al. |
| 2012/0181487 | A1 | 7/2012 | Gibon et al. |
| 2012/0208008 | A1 | 8/2012 | Tour et al. |
| 2012/0211160 | A1* | 8/2012 | Asay ............ C09J 5/00 156/324 |
| 2012/0237749 | A1 | 9/2012 | Aksay et al. |
| 2012/0277360 | A1 | 11/2012 | Scheffer et al. |

(56) References Cited

U.S. PATENT DOCUMENTS

| | | |
|---|---|---|
| 2012/0300364 A1 | 11/2012 | Cai et al. |
| 2012/0301707 A1 | 11/2012 | Kinloch et al. |
| 2012/0302683 A1 | 11/2012 | Ku et al. |
| 2012/0328953 A1 | 12/2012 | Hirohashi et al. |
| 2013/0070390 A1 | 3/2013 | Lee et al. |
| 2013/0084236 A1 | 4/2013 | Hung et al. |
| 2013/0084237 A1* | 4/2013 | Vanier ............... C01B 32/184 |
| | | 204/173 |
| 2013/0119321 A1 | 5/2013 | Lettow |
| 2013/0171502 A1 | 7/2013 | Chen et al. |
| 2013/0197158 A1 | 8/2013 | Kim et al. |
| 2013/0207294 A1 | 8/2013 | Jeon et al. |
| 2013/0280601 A1 | 10/2013 | Geramita et al. |
| 2013/0296479 A1 | 11/2013 | Martin et al. |
| 2013/0330611 A1 | 12/2013 | Chen et al. |
| 2013/0337258 A1 | 12/2013 | Schwendeman et al. |
| 2013/0341194 A1 | 12/2013 | Fuchsbichler et al. |
| 2014/0042989 A1 | 2/2014 | Gogotsi et al. |
| 2014/0057165 A1 | 2/2014 | Yamakaji et al. |
| 2014/0144778 A1 | 5/2014 | Daughenbaugh et al. |
| 2014/0190836 A1 | 7/2014 | Gebregiorgis |
| 2014/0212760 A1 | 7/2014 | Zhao et al. |
| 2014/0248214 A1 | 9/2014 | Hersam et al. |
| 2014/0272591 A1 | 9/2014 | Vanier et al. |
| 2014/0275409 A1 | 9/2014 | Bendiksen et al. |
| 2014/0299818 A1 | 10/2014 | Do et al. |
| 2015/0015902 A1 | 1/2015 | Feng |
| 2015/0017447 A1 | 1/2015 | Moravek et al. |
| 2015/0053668 A1 | 2/2015 | Decker et al. |
| 2015/0058277 A1 | 2/2015 | Ioannidis et al. |
| 2015/0159024 A1 | 6/2015 | Decker et al. |
| 2015/0159030 A1 | 6/2015 | Decker et al. |
| 2015/0240088 A1* | 8/2015 | Asay ............... C09D 7/70 |
| | | 252/511 |
| 2015/0357079 A1 | 12/2015 | Daughenbaugh et al. |
| 2017/0222210 A1 | 8/2017 | Xiao |
| 2019/0300370 A1* | 10/2019 | Vanier ............... C01B 32/186 |

FOREIGN PATENT DOCUMENTS

| | | |
|---|---|---|
| CN | 102683034 | 9/2012 |
| CN | 102877109 | 1/2013 |
| CN | 103468057 | 12/2013 |
| CN | 103956275 | 7/2014 |
| CN | 104884682 | 9/2015 |
| DE | 102010038079 A1 | 4/2012 |
| DE | 102011003619 | 8/2012 |
| EP | 0281644 | 9/1988 |
| EP | 1513026 | 3/2005 |
| EP | 2490284 A1 | 8/2012 |
| EP | 2562766 | 2/2013 |
| GB | 1470617 | 4/1977 |
| GB | 2483373 | 3/2012 |
| JP | 2002-042817 A | 2/2002 |
| JP | 2004325698 | 11/2004 |
| JP | 2007012424 | 1/2007 |
| JP | 2009-501263 A | 1/2009 |
| JP | 2014007141 | 1/2014 |
| KR | 10-2011-0093971 A | 8/2011 |
| KR | 20110089835 | 8/2011 |
| KR | 20120029530 | 3/2012 |
| KR | 20130013689 | 2/2013 |
| KR | 101243296 | 3/2013 |
| RU | 2160750 | 12/2000 |
| RU | 2315794 | 1/2008 |
| WO | 9840415 | 9/1998 |
| WO | 2003062146 A1 | 7/2003 |
| WO | 2004/003096 A1 | 1/2004 |
| WO | 2004083119 A1 | 9/2004 |
| WO | 2005093872 | 10/2005 |
| WO | 2007/050466 A2 | 5/2007 |
| WO | 2008022343 A2 | 2/2008 |
| WO | 2008045778 | 4/2008 |
| WO | 2008/051885 A1 | 5/2008 |
| WO | 2009/012899 A1 | 1/2009 |
| WO | 2009099707 | 8/2009 |
| WO | 2009123771 | 8/2009 |
| WO | 2009106507 | 9/2009 |
| WO | 2009134492 | 11/2009 |
| WO | 2010016976 | 2/2010 |
| WO | 2010072592 | 7/2010 |
| WO | 2010107769 | 9/2010 |
| WO | 2011012874 | 2/2011 |
| WO | 2011084817 | 7/2011 |
| WO | 2011086391 | 7/2011 |
| WO | 2012/045781 A1 | 4/2012 |
| WO | 2013/049498 A1 | 4/2013 |
| WO | 2013165677 | 11/2013 |
| WO | 2013166414 | 11/2013 |
| WO | 2013192180 | 12/2013 |
| WO | 2014/076259 A1 | 5/2014 |
| WO | 2014070346 | 5/2014 |
| WO | 2014/085252 A1 | 6/2014 |
| WO | 2015089026 | 6/2015 |

OTHER PUBLICATIONS

Brunaeur et al., "Adsorption of Gases in Multimolecular Layers", Journal of the American Chemical Society, 1938, vol. 60, pp. 309-313.

Cassagneau et al., "Preparation of Layer-by-Layer Self-Assembly of Silver Nanoparticles Capped by Graphite Oxide Nanosheets", J. Phys. Chem. B 1999, 103, 1789-1793.

Chen et al., "Oxidation Rsistance of Graphene-Coated Cu and Cu/Ni Alloy", ACS Nano, Jan. 28, 2011, pp. 1321-1327.

Choi et al., "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.

Coraux, "Growth of Graphene on Ir(111)", New Journal of Physics 11, 2009, 023006, pp. 1-22.

Dato et al., "Substrate-Free Gas-Phase Synthesis of Graphene Sheets", Nano Letters, vol. 8, No. 7, 2008, pp. 2012-2016.

Dresselhaus et al., "Science of Fullerenes and Carbon Nanotubes", Academic Press, Inc., 1996, pp. 60-79.

Du et al., "Facile Synthesis of Highly Conductive Polyaniline/Graphite Nanocomposites", European Polymer Journal 40, 2000, pp. 1489-1493.

Fincke et al., "Plasma Pyrolysis of Methane to Hydrogen and Carbon Black", Ind. Eng. Chem. Res., 2002, pp. 1425-1435.

Fitzer et al., "Recommended Terminology for the Description of Carbon as a Solid", International Union of Pure and Applied Chemistry, Inorganic Chemistry Division, Pure Applied Chemistry, vol. 67, No. 3, 1995, pp. 473-506.

Gannon, "Acetylene from Hydrocarbons", Kirk-Othmer Encyclopedia of Chemical Technology, 2003, pp. 1-28.

Gomez de Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.

Gonzalez-Aguilar et al., "Carbon Nanstructures Production by Gas-Phase Plasma Processes at Atmospheric Pressure", J. Phys. D: Appl. Phys. 40, 2007, pp. 2361-2374.

Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.

Ji et al., "Graphene/Si Multilayer Structure Anodes for Advanced Half and Full Lithium-Ion Cells", Nano Energy, 2011.

Khan et al., "Survey of Recent Methane Pyrolysis Literature", Industrial and Engineering Chemistry, vol. 62, No. 10, Oct. 1970.

Kim et al., "Continuous Synthesis of Nanostructured Sheetlike Carbons by Thermal Plasma Decomposition of Methane", IEEE Transactions on Plasma Science, vol. 35, No. 2, Apr. 2007.

Kim et al., "Fabrication of Graphene Flakes Composed of Multi-Layer Graphene Sheets using a Thermal Plasma Jet System", Nanotechnology 21, Jan. 29, 2010.

(56) References Cited

OTHER PUBLICATIONS

Kostic et al., "Thermodynamic Consideration of B—O—C—H System for Boron Carbide (B4C) Powder Synthesis in Thermal Plasma", Progress in Plasma Processing of Materials, 1997, pp. 889-898.

Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997.

Malesevic et al., "Synthesis of Few-Layer Graphene via Microwave Plasma-Enhanced Chemical Vapour Deposition", Nanotechnology 2008, vol. 19, No. 30, 305604 (6 pps).

Martin-Gallego et al., "Epoxy-Graphene UV-Cured Nanocomposites", Polymer, vol. 52, 2011, pp. 4664-4669.

McWilliams, "Graphene: Technologies, Applications, and Markets", BCC Research Report, Feb. 2011.

Nandamuri et al., "Chemical Vapor Deposition of Graphene Films", Nanotechnology 21, 2010, 145604 (4 pp.).

Prasai et al., "Graphene: Corrosion-Inhibiting Coating", ACS Nano, 6 (2), 2012, pp. 1102-1108.

Pristavita et al., "Carbon Blacks Produced by Thermal Plasma: the Influence of the Reactor Geometry on the Product Morphology", Plasma Chem. Plasma Process, 30, 2010, pp. 267-279.

Pristavita et al., "Carbon Nano-Flakes Produced by an Inductively Coupled Thermal Plasma System for Catalyst Applications", Plasma Chem. Plasma Process, 31, 2011, pp. 393-403.

Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.

Rafiee et al., "Enhanced Mechanical Properties of Nanocomposites at Low Graphene Content", ACSNANO, vol. 3, No. 12, 2009.

Skinner, "Pyrolysis of Methane and the C2 Hydrocarbons", Monsanto Chemical Co., Research and Engineering Division, Dayton 7, Ohio, pp. 59-68.

Soldano, C, et al., "Production properties and potential of graphene", Carbon, 2010, vol. 48, pp. 1-57.

Su et al., "Could Graphene Construct an Effective Conducting Network in a High-Power Lithium Ion Battery?", Nano Energy, Feb. 25, 2012.

Su et al., "Flexible and Planar Graphene Conductive Additives for Lithium-Ion Batteries", J. Mater. Chem., 20, 2010, pp. 9644-9650.

Subrahmanyam et al., "Simple Method of Preparing Graphene Flakes by an ARC-Discharge Method", The Journal of Physical Chemistry C, vol. 113, No. 11, 2009, pp. 4257-4259.

Tang et al., Processible Nanostructured Materials with Electrical Conductivity and Magnetic Susceptibility: Preparation and Properties of Maghemite/Polyaniline Nanocomposite Films, Chem. Mater., 1999, 11, 1581-1589.

Thomas Swan Advanced Materials, "Elicarb.RTM. Graphene Powder and Elicarb.RTM. Graphene Dispersion (AQ)", 2014, 2 pages.

Verdejo et al., "Functionalized graphene sheet filled silicone foam nanocomposites", Journal of Materials Chemistry, Mar. 19, 2008, The Royal Society of Chemistry, vol. 18, pp. 2221-2226.

XG Sciences, The Material Difference, "xGnP.RTM. Graphene Nanoplatelets: A unique carbon nonomaterial with multifunctional properties", 2013, 3 pages.

Yun et al., "Thermal Conductivity and Interconnectivity of Hexamethylene Diisocynate Contained Polyerethane Grafted Multiwall Carbon Nanotube/Polyurethane Nanocomposite Film", Materials Transactions, Jan. 26, 2011, The Japan Institute of Metals, vol. 52, No. 3, pp. 564-567.

Zhong et al., "Catalytic Growth of Carbon Nanoballs With and Without Cobalt Encapsulation", Cemical Physics Letters 330, 2000, pp. 41-47.

Chuanxin et al., "Handbook of Surface Treatment Techniques", Beijing University of Technology Press, 1st Ed., Jul. 2009, p. 202, paragraph 1, 3 pages.

Ma, Lai-Peng et al. : "Hydrogen adsorption behavior of graphene above critical temperature", International Journal of Hydrogen Energy, 34, 2009, 2329-2332.

Srinivas, G et al. : "Synthesis of graphene-like nanosheets and their hydrogen adsorption capacity", Carbon vol. 48, 2009, 630-635.

Extract from PPG Industries Ohio, Inc. opposition dated Jan. 31, 2019.

Notice of Opposition from European Patent Office against PPG Industries Ohio, Inc. by Levidian Nanosystems, for corresponding European Patent Application No. 12772662.8 dated Mar. 4, 2024.

"Lithium iron phosphate battery", Wikipedia, http://en.wikipedia.org/wiki/Lithium-iron-phosphate-battery, last modified Feb. 27, 2014.

Chen et al., "Application of Organometallic Chemistry to the Electrical Interconnection of Graphene Nanoplatelets", Chem. Mater., 2016, vol. 28 (7), pp. 2260-2266.

Dresselhaus MS, et al., "Structure of fullerness", Science of Fullerenes and Carbon Nanotubes, 1996, pp. 60-79, Chapter 3, Elsevier Inc., USA.

H. Mazor, D. Golodnitsky, L. Burstein, A. Gladkich, E. Peled, "Electrophoretic deposition of lithium iron phosphate cathode for thin-film 3D-microbatteries", Journal of Power Sources 198 (2012) 264-272, Elsevier B.V.

Kang et al., "Effects of Carbonaceous Materials on the Physical and Electrochemical Performance of a LiFePO4 Cathode for Lithium-Ion Batteries" New Carbon Materials, 2011, vol. 26, No. 3, pp. 161-170.

Kang, Junmo et al., "High-Performance Graphene-Based Transparent Flexible Heaters", Nano Letters; Dec. 14, 2011; pp. 5154-5158; vol. 11, No. 12; ACS Publications, American Chemical Society.

Machine English translation of EP2490284A1.

Matsumoto et al., "Perfect blackbody radiation from a graphene nanostructure with application to high-temperature spectral emissivity measurements", Optics Express, vol. 21, No. 25, Dec. 2013, DOI: 10.1364/OE.21.030964, pp. 30964-30974.

Mazor et al., "Electrophoretic Deposition of Lithium Iron Phosphate Cathode for Thin-Film 3D-Microbatteries", Journal of Power Sources 198, 2012, Elsevier B.V., pp. 264-272.

Porcher et al., "Design of Aqueous Processed Thick LiFePO4 Composite Electrodes for High-Energy Lithium Battery", Journal of The Electrochemical Society, 156 (3), (2009), pp. A133-A144.

Tagawa et al., "Production Processes for Fabrication of Lithium-Ion Batteries", Lithium-Ion Batteries, 2009, Chapter 8, Springer, NY, pp. 181-194.

\* cited by examiner

GRAPHENIC CARBON PARTICLES

CROSS REFERENCE TO RELATED APPLICATIONS

This application is a continuation-in-part application of U.S. patent application Ser. No. 14/432,129 filed Mar. 27, 2015, now U.S. Pat. No. 10,294,375 issued May 21, 2019, which is a 371 national stage entry of PCT/US2013/062306 filed Sep. 27, 2013, which claims priority to U.S. Provisional Patent Application Ser. No. 61/794,586 filed Mar. 15, 2013. PCT/US2013/062306 filed Sep. 27, 2013, is a continuation-in-part of PCT/US2012/057811 filed Sep. 28, 2012, which is a continuation-in-part of U.S. patent application Ser. No. 13/309,894 filed Dec. 2, 2011, now U.S. Pat. No. 8,486,364 issued Jul. 16, 2013, and a continuation-in-part of U.S. patent application Ser. No. 13/249,315 filed Sep. 30, 2011, now U.S. Pat. No. 8,486,363 issued Jul. 16, 2013. U.S. patent application Ser. No. 13/309,894 filed Dec. 2, 2011, now U.S. Pat. No. 8,486,364 issued Jul. 16, 2013, is a continuation-in-part of U.S. patent application Ser. No. 13/249,315 filed Sep. 30, 2011, now U.S. Pat. No. 8,486,363 issued Jul. 16, 2013.

FIELD OF THE INVENTION

The present invention relates to graphenic carbon particles and, more particularly, relates to graphenic carbon particles having desirable characteristics that may be produced by thermal processes.

BACKGROUND OF THE INVENTION

Graphene is an allotrope of carbon having a structure that is one atom thick. The planar structure comprises $sp^2$-bonded carbon atoms that are densely packed in a honeycomb crystal lattice. Graphenic materials approach this ideal structure by having on average only a few one-atom-thick planar sheets of $sp^2$-bonded carbon atoms stacked together.

SUMMARY OF THE INVENTION

An aspect of the present invention is to provide graphenic carbon particles having an aspect ratio of greater than 3:1, a B.E.T. specific surface area of at least 50 square meters per gram, an average of 3 or more carbon atom layers, and a Raman spectroscopy 2D/G peak ratio of at least 1:1.

This and other aspects of the present invention will be more apparent from the following description.

DETAILED DESCRIPTION

Figure 1:
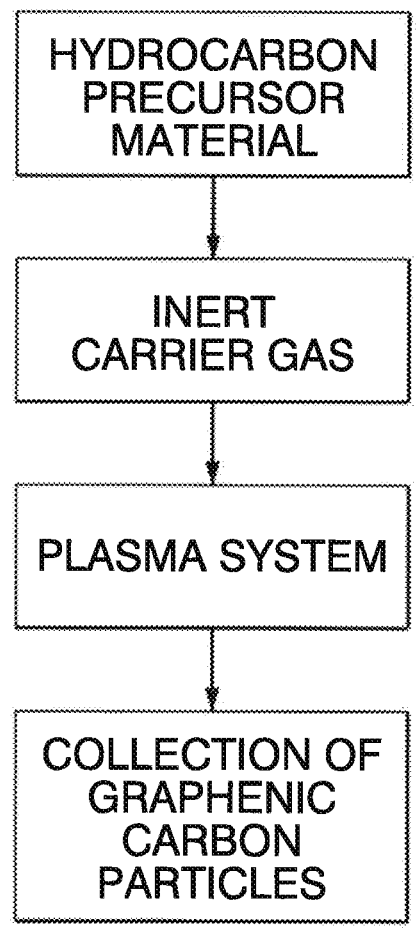
FIG. 1 is a schematic flow diagram illustrating a method of forming graphenic carbon particles from a hydrocarbon precursor material.

Certain embodiments of the present invention are directed to graphenic carbon particles having desirable characteristics. As used herein, the term "graphenic carbon particles" means carbon particles having structures comprising one or more layers of one-atom-thick planar sheets of $sp^2$-bonded carbon atoms that are densely packed in a honeycomb crystal lattice. The graphenic carbon particles may be substantially flat, however, at least a portion of the planar sheets may be substantially curved, curled, creased or buckled. The particles typically do not have a spheroidal or equiaxed morphology.

The average number of stacked layers of the graphenic carbon particles may be less than 100, for example, less than 50. In certain embodiments, the average number of stacked layers is less than 30, or less than 20. In certain embodiments, the graphenic carbon particles may have an average of 3 carbon atom layers or more, for example, an average of 3.2 or more carbon atom layers, or 3.5 or more atom layers, 4 or more atom layers, or 5 or more atom layers. In certain embodiments, the graphenic carbon particles have from 3 to 10 atom layers, or from 4 to 7 atom layers. The average number of atomic layers may be determined from standard X-ray diffraction (XRD) techniques and from transmission electron microscopy (TEM) images of the particles using standard imaging software.

In certain embodiments, the graphenic carbon particles of the present invention have a thickness, measured in a direction perpendicular to the carbon atom layers, of no more than 10 nanometers, such as no more than 5 nanometers, or, in certain embodiments, no more than 4 or 3 or 1 or 2 nanometers, such as no more than 3.6 nanometers.

In certain embodiments, the graphenic carbon particles have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 5:1 or greater than 10:1, or greater than 15:1, or greater than 25:1, or greater than 100:1, or greater than 500:1.

In certain embodiments, the graphenic carbon particles have relatively low oxygen content. For example, the graphenic carbon particles may, even when having a thickness of no more than 5 or no more than 2 nanometers, have an oxygen content of no more than 4 atomic percent, or no more than 3 atomic percent, or no more than 2 atomic percent, such as no more than 1.5 or 1 atomic percent, or no more than 0.6 atomic percent, such as about 0.5 atomic percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles have a B.E.T. specific surface area of at least 50 square meters per gram, such as at least 70 square meters per gram, or at least 100 square meters per gram. For example, the surface area may be from 100 or 150 to 1,000 square meters per gram, or from 150 to 300 or 400 or 500 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles have a Raman spectroscopy 2D/G peak ratio of at least 1:1, for example, greater than 1:1, or greater than 1:05:1, or greater than 1.15:1, or greater than 1.2:1, or greater than 1.3:1. As used herein, the term "2D/G peak ratio" refers to the ratio of the intensity of the 2D peak at 2692 $cm^{-1}$ to the intensity of the G peak at 1,580 $cm^{-1}$. In certain embodiments, the Raman spectroscopy 2D peak of the present graphenic carbon particles is relatively sharp, indicating that the present multi-layer graphenic carbon particles are turbostratic in nature.

In certain embodiments, the graphenic carbon particles exhibit turbostratic properties in which adjacent atomic layers in a multi-layer particle are misaligned with each other in comparison with typical layer-to-layer alignment associated with exfoliated graphene nano-platelets. Turbostratic misalignment may result in increased spacings between adjacent atomic layers, which can be measured by X-ray diffraction techniques that indicate d-spacings between the layers. For example, the graphenic carbon particles of the present invention may have typical atomic inter-layer d-spacings of greater than 3.38 Angstroms, or greater than 3.39 or 3.40 Angstroms. In certain embodiments, the atomic inter-layer d-spacing may be from 3.40 to 3.50 Angstroms or from 3.41 to 3.45 Angstroms.

X-ray diffraction techniques may also be used to determine the average crystallite size of the present graphenic carbon particles. For example, the primary peak of an X-ray diffraction plot can be used to measure its full half width, in degrees, at half of the height of the primary peak, and the Sherrer equation known to those skilled in the art can be used to calculate the corresponding average crystallite size of the graphenic carbon particles. In certain embodiments, the average crystallite size is less than 35 nm, or less than 30 nm, or less than 20 nm, or less than 10 nm, or less than 5 nm.

In certain embodiments, the graphenic carbon particles have a relatively low bulk density. For example, the graphenic carbon particles are characterized by having a bulk tap density of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 $g/cm^3$ or less, such as less than 0.8 $g/cm^3$, less than 0.7 $g/cm^3$, such as from 0.6 to 0.7 $g/cm^3$. In certain embodiments, the percent densification of the graphenic carbon particles is less than 40 percent such as less than 30 percent, such as from 25 to 30 percent.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3) = \frac{0.1 \text{ grams}}{\Pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

In certain embodiments, the graphenic carbon particles have a measured bulk liquid conductivity of at least 10 microSiemens, such as at least 30 microSiemens, such as at least 100 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the materials in which the graphenic particles are dispersed. The conductive graphenic particles may occupy a minimum volume within a composite matrix such that the particles form a continuous, or nearly continuous, network. In such a case, the aspect ratios of the graphenic carbon particles may affect the minimum volume required for percolation. Furthermore, the surface energy of the graphenic carbon particles may be the same or similar to the surface energy of the matrix material. Otherwise, the particles may tend to flocculate or demix as they are processed.

In accordance with embodiments of the invention, the graphenic carbon particles of the present invention may be produced from hydrocarbon precursor materials that are heated to high temperatures in a thermal zone. The hydrocarbon precursor materials may be any organic molecule that contains carbon and hydrogen, and has a molecular structure which, when heated to the elevated temperatures under inert conditions as described herein, yields a two-carbon-fragment species, i.e., a species having two carbon atoms bonded together. The two-carbon-fragment species may comprise carbon alone or, in certain embodiments, may include at least one hydrogen atom. While not intending to be bound by any particular theory, at the high thermal zone temperatures, decomposition occurs and the hydrogen atoms may be entirely or partially lost. The remaining two-carbon-fragment species form graphenic carbon particles with relatively high product yields in accordance with embodiments of the invention.

In certain embodiments, small molecule hydrocarbon precursor materials that produce two-carbon-fragment species during the thermal treatment process are used to produce high quality graphenic carbon particles. Examples of hydrocarbon precursor materials include n-propanol, ethane, ethylene, acetylene, vinyl chloride, 1,2-dichloroethane, allyl alcohol, propionaldehyde, vinyl bromide and the like. Other feed materials that yield two-carbon-fragment species on thermolysis may also be used. The structures of some hydrocarbon precursors capable of forming two-carbon-fragment species are shown below.

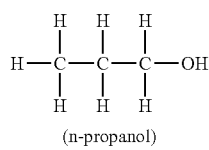

(n-propanol)

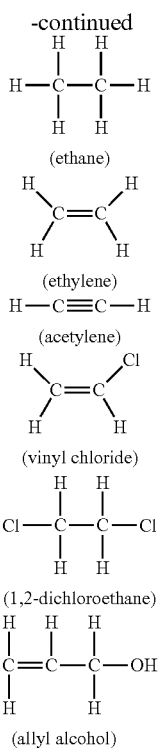

(ethane)

(ethylene)

(acetylene)

(vinyl chloride)

(1,2-dichloroethane)

(allyl alcohol)

In accordance with embodiments of the invention, the graphenic carbon particles of the present invention may be produced from methane precursor materials that are heated to high temperatures in a thermal zone. As used herein, the term "methane precursor material" means a material comprising significant amounts of methane, typically at least 50 weight percent methane. For example, the methane precursor material may comprise gaseous or liquid methane of at least 95 or 99 percent purity or higher. In certain embodiments, the methane precursor may have a purity of at least 99.9 or 99.99 percent. In an embodiment, the methane precursor may be provided in the form of natural gas.

While not intending to be bound by any particular theory, at the high thermal zone temperatures, decomposition or pyrolysis of methane may involve the formulation of two-carbon-fragment species:

$CH_4 \rightarrow .CH_3 + H$ $CH_4 + H. \rightarrow .CH_3 + H_2$ $CH_3 + .CH_3 \rightarrow C_2H_6$ $C_2H_6 \rightarrow C_2H_4 + H_2$ $C_2H_4 \rightarrow C_2H_2 + H_2$ In certain embodiments, low concentrations of additional feed materials or dopants comprising atoms of B, N, O, F, Al, Si, P, S and/or Li may be introduced in the thermal zone to produce doped graphene containing low levels of the doping atom or atoms. The dopant feed materials typically comprise less than 15 weight percent relative to the concentration of methane. Functionalization or doping of the graphene may also be effected by introducing these dopants or reactive organic molecules at a cooler zone of the process such as at or near the quench location. For example, a low concentration of oxygen introduced at the quench stage could result in functionalization of the graphene with hydroxyl, epoxy and/or carboxyl groups.

FIG. 1 is a flow diagram depicting certain embodiments of the methods for producing graphenic particles of the present invention. At least one hydrocarbon precursor material selected in accordance with the present invention is provided as a feed material. In accordance with certain methods of the present invention, the hydrocarbon precursor feed materials are contacted with an inert carrier gas. Suitable inert carrier gases include, but are not limited to, argon, hydrogen, helium, nitrogen and combinations thereof.

Next, in accordance with certain embodiments of the present invention, the hydrogen precursor materials are heated in a thermal zone, for example, by a plasma system. In certain embodiments, the hydrogen precursor materials are heated to a temperature ranging from 1,000° C. to 20,000° C., such as 1,200° C. to 10,000° C. or 20,000° C. For example, the temperature of the thermal zone may range from 1,500° C. to 10,000° C., such as from 2,000° C. to 10,000° C., or may range from greater than 3,500° C. to 10,000° C. or 20,000° C. Although the thermal zone may be generated by a plasma system in accordance with embodiments of the present invention, it is to be understood that any other suitable heating system may be used to create the thermal zone, such as various types of furnaces including electrically heated tube furnaces and the like.

In certain embodiments, the gaseous stream is contacted with one or more quench streams that are injected into the plasma chamber through at least one quench stream injection port. For example, the quench streams are injected at flow rates and injection angles that result in impingement of the quench streams with each other within the gaseous stream. The quench stream may cool the gaseous stream to facilitate the formation or control the particle size or morphology of the graphenic carbon particles. Materials suitable for use in the quench streams include, but are not limited to, inert gases such as argon, hydrogen, helium, nitrogen and the like.

In certain embodiments, the particular flow rates and injection angles of the various quench streams may vary, and may impinge with each other within the gaseous stream to result in the rapid cooling of the gaseous stream. For example, the quench streams may primarily cool the gaseous stream through dilution, rather than adiabatic expansion, thereby causing a rapid quenching of the gaseous stream, before, during and/or after the formation of the graphenic carbon particles. Such quenching may occur in certain embodiments prior to passing the particles into and through a converging member, such as a converging-diverging nozzle, as described below.

In certain embodiments, after contacting the gaseous product stream with the quench streams, the ultrafine particles may be passed through a converging member, wherein the plasma system is designed to minimize the fouling thereof. In certain embodiments, the converging member comprises a converging-diverging (de Laval) nozzle. In these embodiments, while the converging-diverging nozzle may act to cool the product stream to some degree, the quench streams perform much of the cooling so that a substantial amount of the graphenic carbon particles are formed upstream of the nozzle. In these embodiments, the converging-diverging nozzle may primarily act as a choke position that permits operation of the reactor at higher pressures, thereby increasing the residence time of the materials therein.

As is seen in FIG. 1, in certain embodiments of the present invention, after the graphenic carbon particles exit the plasma system, the thermally produced graphenic carbon particles may be collected. Any suitable means may be used to separate the graphenic carbon particles from the gas flow, such as, for example, a bag filter, cyclone separator or deposition on a substrate.

In accordance with embodiments of the invention, relatively high product yields are achieved. For example, the weight of the collected graphenic particles may be at least 10 or 12 percent of the weight of the hydrocarbon precursor material that is fed to the plasma system.

Figure 2:
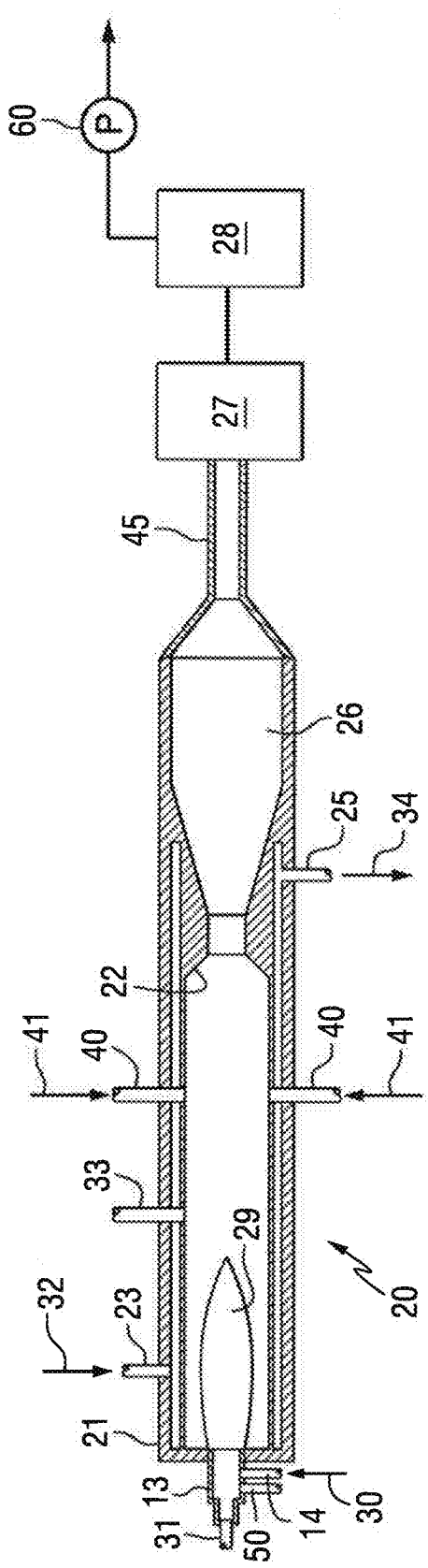
FIG. 2 is a partially schematic longitudinal section view of a plasma system for producing graphenic carbon particles in accordance with an embodiment of the present invention.

FIG. 2 is a partially schematic sectional diagram of an apparatus for producing graphenic carbon particles of the present invention. A plasma chamber 20 is provided that includes a feed inlet 50 which, in the embodiment shown in FIG. 2, is used to introduce the hydrocarbon precursor material into the plasma chamber 20. In another embodiment, the feed inlet 50 may be replaced with separate inlets (not shown) for the feed material. Also provided is at least one carrier gas feed inlet 14, through which a carrier gas flows in the direction of arrow 30 into the plasma chamber 20. The carrier gas and hydrocarbon precursor material form a gas-stream which flows towards plasma 29. A cooling inlet 23 and outlet 25 may be present for a double-walled plasma chamber 20. In these embodiments, coolant flow is indicated by arrows 32 and 34.

In the embodiment shown in FIG. 2, a plasma torch 21 is provided. The torch 21 may thermally decompose or vaporize the feed materials within or near the plasma 29 as the stream is delivered through the inlet of the plasma chamber 20. As is seen in FIG. 2, the feed materials are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9,000 K.

A plasma can be produced with any of a variety of gases. This can give excellent control over the occurrence of any chemical reactions taking place in the plasma, as the gas may be inert, such as argon, helium, nitrogen, hydrogen or the like. Such inert gases may be used to produce graphenic carbon particles in accordance with the present invention. In FIG. 2, the plasma gas feed inlet is depicted at 31.

As the gaseous product stream exits the plasma 29, it proceeds towards the outlet of the plasma chamber 20. An additional stream can optionally be injected into the reaction chamber prior to the injection of the quench streams. A supply inlet for the additional stream is shown in FIG. 2 at 33.

As is seen in FIG. 2, in certain embodiments, the gaseous stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams may result in impingement of the quench streams 41 with each other within the gaseous stream, in some cases at or near the center of the gaseous stream, to result in the rapid cooling of the gaseous stream to control the particle size and/or morphology of the graphenic carbon particles. This may result in a quenching of the gaseous stream through dilution.

In certain embodiments, contacting the gaseous stream with the quench streams may result in the formation and/or control of the size or morphology of the graphenic carbon particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

In certain embodiments, the converging member comprises a converging-diverging (de Laval) nozzle, such as that depicted in FIG. 2, which is positioned within the outlet of the plasma chamber 20. The converging or upstream section of the nozzle, i.e., the converging member, restricts gas passage and controls the residence time of the materials within the plasma chamber 20. It is believed that the contraction that occurs in the cross sectional size of the stream as it passes through the converging portion of nozzle 22 changes the motion of at least some of the flow from random directions, including rotational and vibrational motions, to a straight line motion parallel to the plasma chamber axis. In certain embodiments, the dimensions of the plasma chamber 20 and the material flow are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 may be maintained at a vacuum pressure by operation of a vacuum producing device, such as a vacuum pump 60. Following passage through nozzle 22, the graphenic carbon particles may then enter a cool down chamber 26.

Although the nozzle shown in FIG. 2 includes a converging portion and a downstream diverging portion, other nozzle configurations may be used. For example, the downstream diverging portion may be replaced with a straight portion. Quench streams may be introduced at or near the transition from the converging portion to the straight portion.

As is apparent from FIG. 2, in certain embodiments, the graphenic carbon particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

In certain embodiments, the residence times for materials within the plasma chamber 20 are on the order of milliseconds. The hydrocarbon precursor materials may be injected under pressure (such as from 1 to 300 psi) through a small orifice to achieve sufficient velocity to penetrate and mix with the plasma. In addition, in many cases the injected stream is injected normal (90° angle) to the flow of the plasma gases. In some cases, positive or negative deviations from the 90° angle by as much as 30° may be desired.

The high temperature of the plasma may rapidly decompose and/or vaporize the feed materials. There can be a substantial difference in temperature gradients and gaseous flow patterns along the length of the plasma chamber 20. It is believed that, at the plasma arc inlet, flow is turbulent and there may be a high temperature gradient, e.g., from temperatures of up to about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber 20 may be determined by the fluid properties of the plasma and moving gaseous stream. It should be sufficiently great to permit necessary gaseous flow, but not so large that recirculating eddys or stagnant zones are formed along the walls of the chamber. Such detrimental flow patterns can cool the gases prematurely and precipitate unwanted products. In many cases, the inside diameter of the plasma chamber 20 is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45° degree.) leading into the nozzle throat. The purpose of the nozzle throat is often to compress the gases and achieve sonic velocities in the flow. The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE37,853 at col. 9, line 65 to col. 11, line 32, the cited portion of which being incorporated by reference herein.

The following examples are intended to illustrate certain embodiments of the present invention, and are not intended to limit the scope of the invention.

EXAMPLE 1

Figure 3:
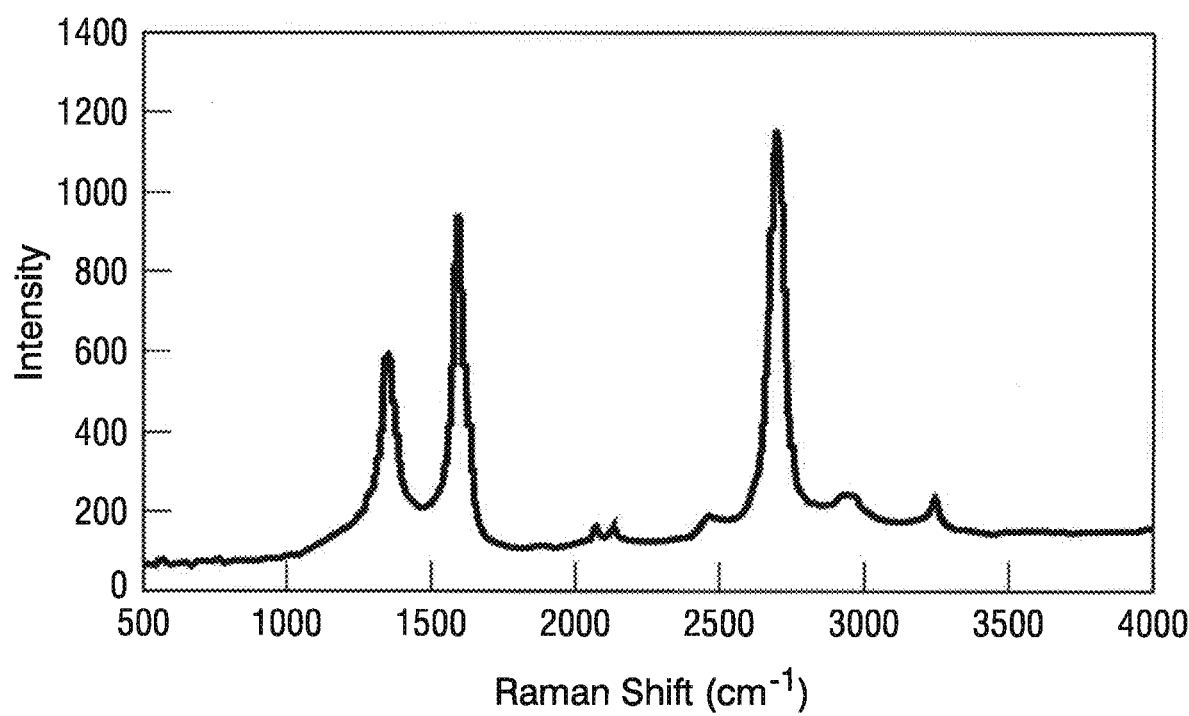
FIG. 3 is a plot of Raman shift versus reflectance for a sample of graphenic carbon particles produced from an n-propanol hydrocarbon precursor material in accordance with an embodiment of the present invention.
Figure 4:
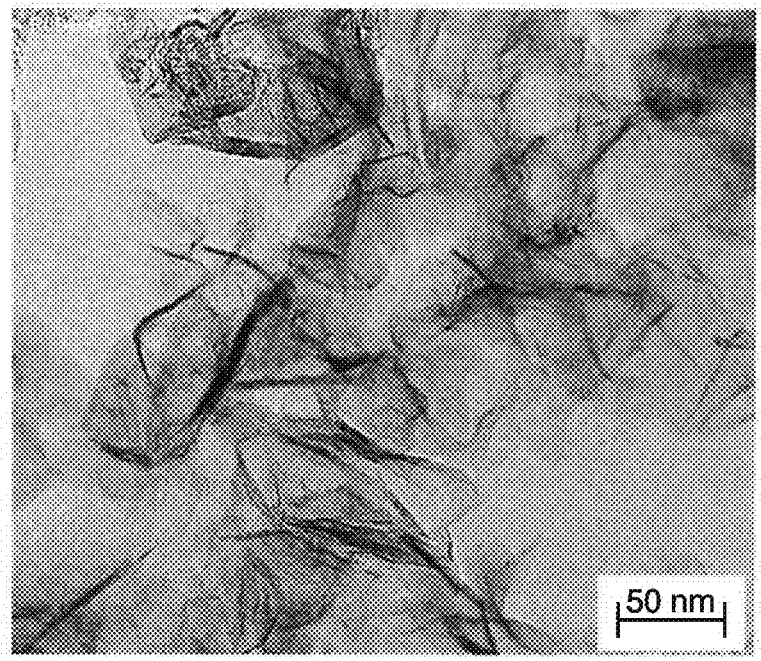
FIGS. 4 and 5 are TEM micrographs of the graphenic carbon particles corresponding to FIG. 3.
Figure 5:
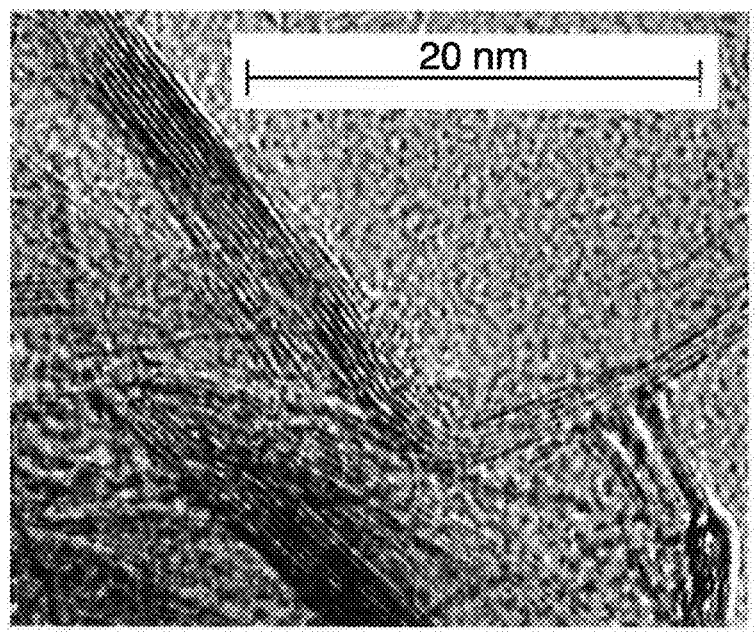

Graphenic carbon particles were produced using a DC thermal plasma reactor system similar to that shown in FIG. 2. The main reactor system included a DC plasma torch (Model SG-100 Plasma Spray Gun commercially available from Praxair Technology, Inc., Danbury, Connecticut) operated with 60 standard liters per minute of argon carrier gas and 26 kilowatts of power delivered to the torch. N-propanol precursor (commercially available from Alfa Aesar, Ward Hill, Massachusetts) was fed to the reactor at a rate of 12 grams per minute through a gas assisted liquid nebulizer located about 0.5 inch down stream of the plasma torch outlet. At the nebulizer, 15 standard liters per minute of argon were delivered to assist in atomization of the liquid precursors. Following a 14-inch long reactor section, a plurality of quench stream injection ports were provided that included 6⅛ inch diameter nozzles located 60° apart radially. Quench argon gas was injected through the quench stream injection ports at a rate of 185 standard liters per minute. The produced particles were collected in a bag filter. The solid material collected was 13 weight percent of the feed material, corresponding to a 13 percent yield. Analysis of particle morphology using Raman analysis and high resolution transmission electron microscopy (TEM) indicates the formation of a graphenic layer structure with average thickness of less than 3.6 nm. The Raman plot shown in FIG. 3 demonstrates that graphenic carbon particles were formed by virtue of the sharp and tall peak at 2692 on the plot versus shorter peaks at 1348 and 1580. The TEM image of FIG. 4 shows the thin plate-like graphenic particles, while the higher magnification TEM image of FIG. 5 shows an edge view of one of the platelets having several stacked atomic layers.

EXAMPLE 2

Example 1 was repeated, except ethanol having the molecular structure shown below was used as the feed material (commercially available from Alfa Aesar, Ward Hill, Massachusetts).

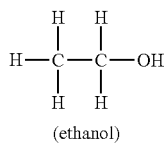
(ethanol)

Figure 6:
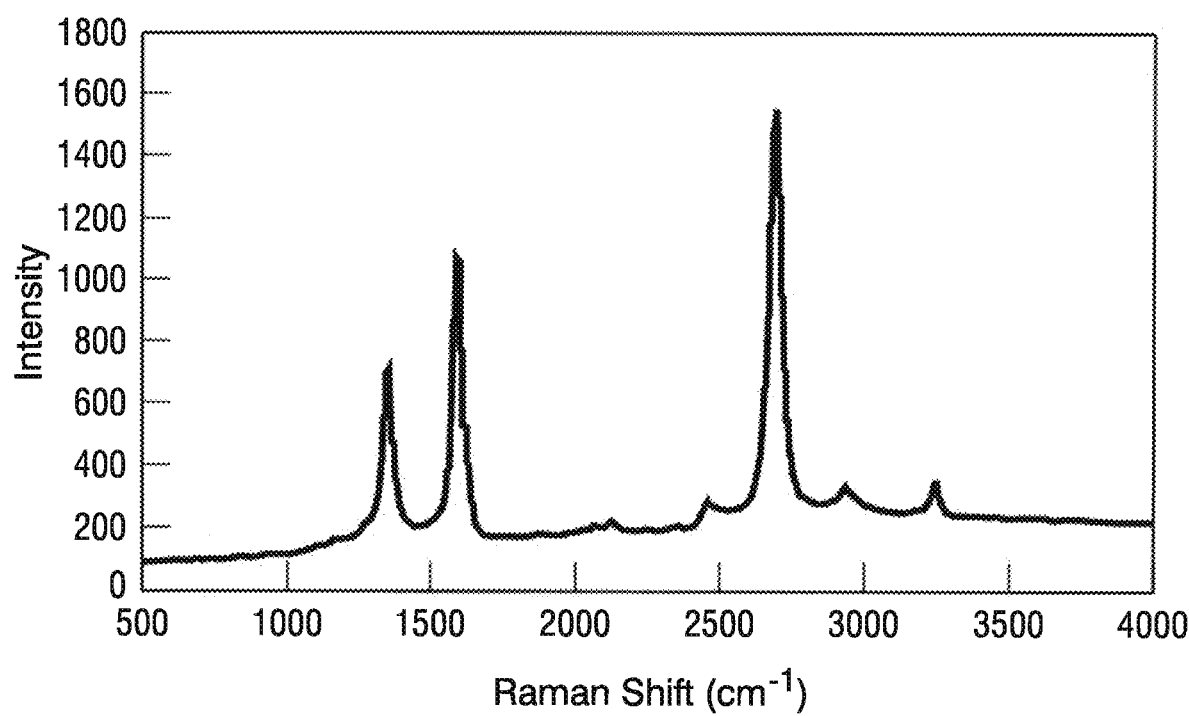
FIG. 6 is a plot of Raman shift versus reflectance for a sample of graphenic carbon particles produced from an ethanol precursor material.
Figure 7:
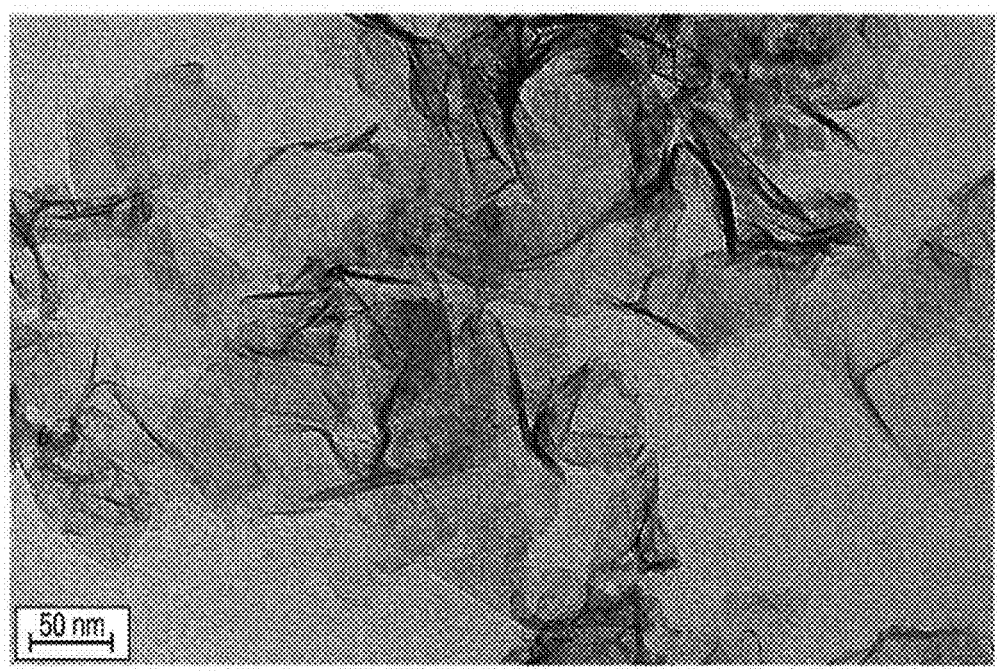
FIGS. 7 and 8 are TEM micrographs of the graphenic carbon particles corresponding to FIG. 6.
Figure 8:
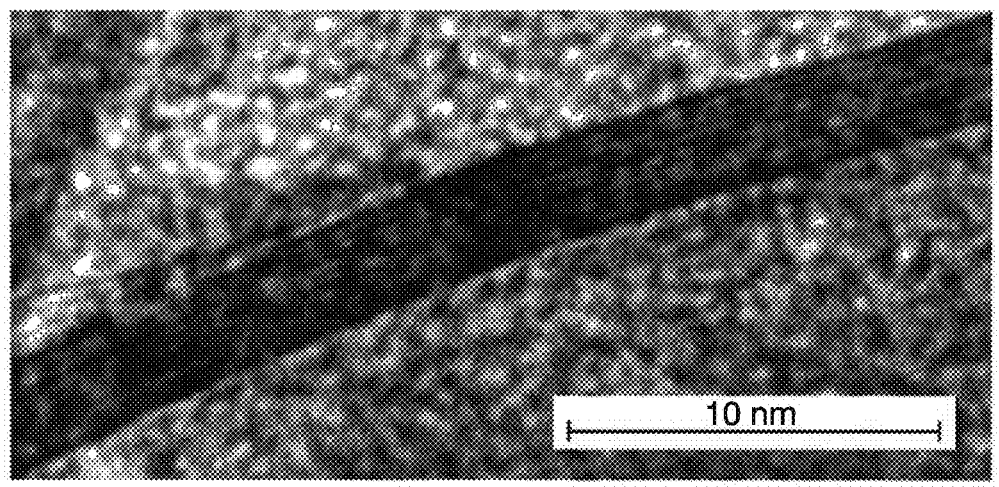

The solid material collected was only 1 weight percent of the feed material, corresponding to a 1 percent yield. Raman and TEM analysis of the particle morphology as illustrated in FIGS. 6-8 indicates the formation of a graphenic layer structure.

EXAMPLE 3

Example 1 was repeated, except iso-propanol having the molecular structure shown below was used as the feed material (commercially available from Alfa Aesar, Ward Hill, Massachusett(s).

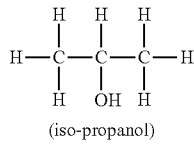
(iso-propanol)

Figure 9:
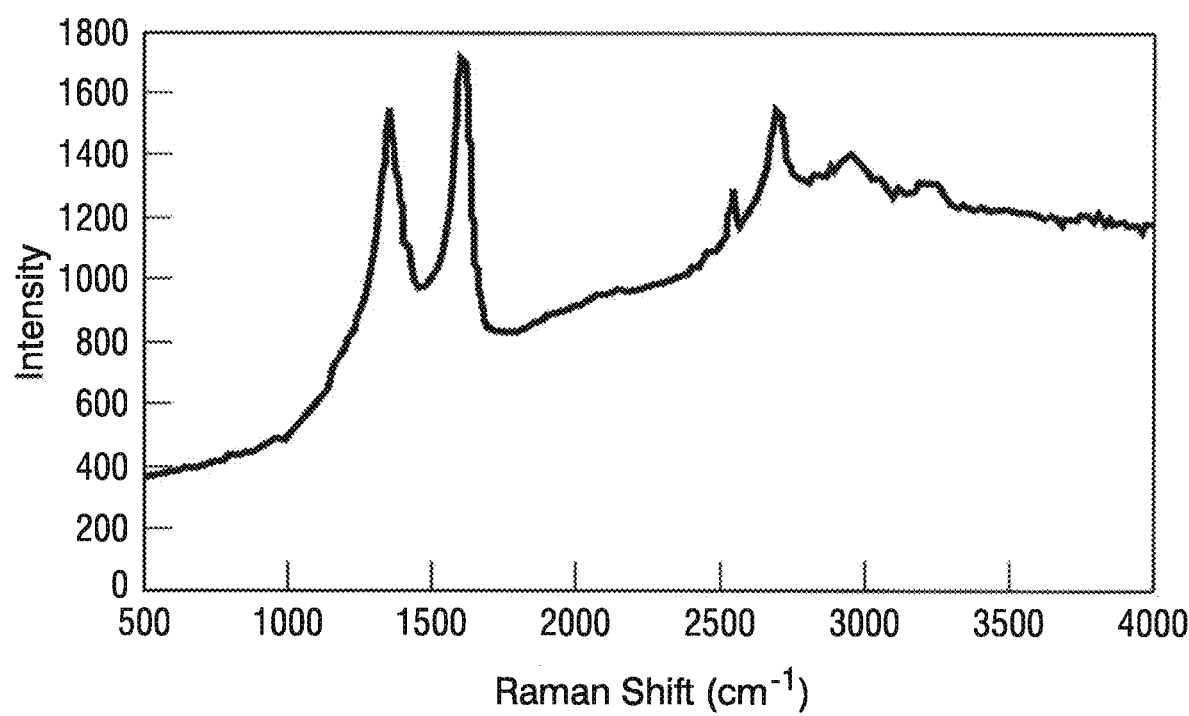
FIG. 9 is a plot of Raman shift versus reflectance for a sample of carbon particles produced from an iso-propanol precursor material.
Figure 10:
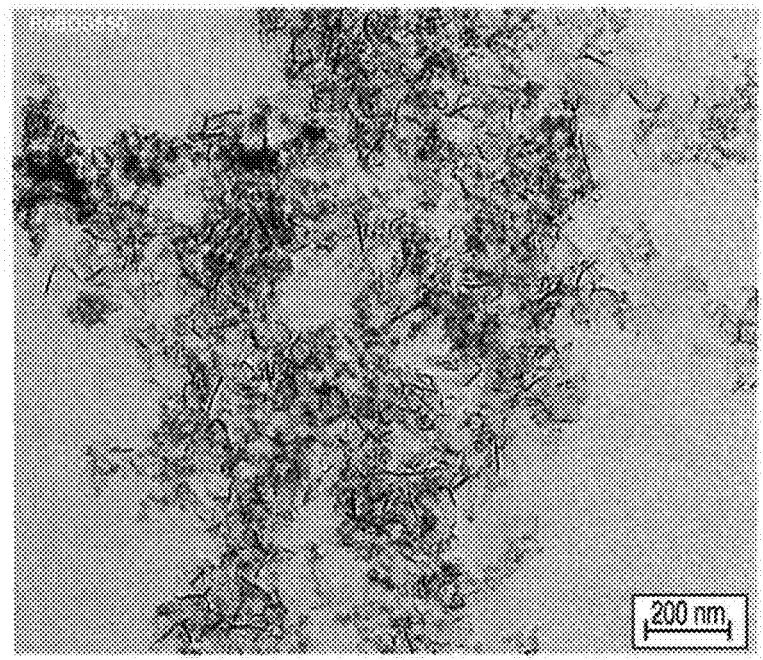
FIGS. 10 and 11 are TEM micrographs of the carbon particles corresponding to FIG. 9.
Figure 11:
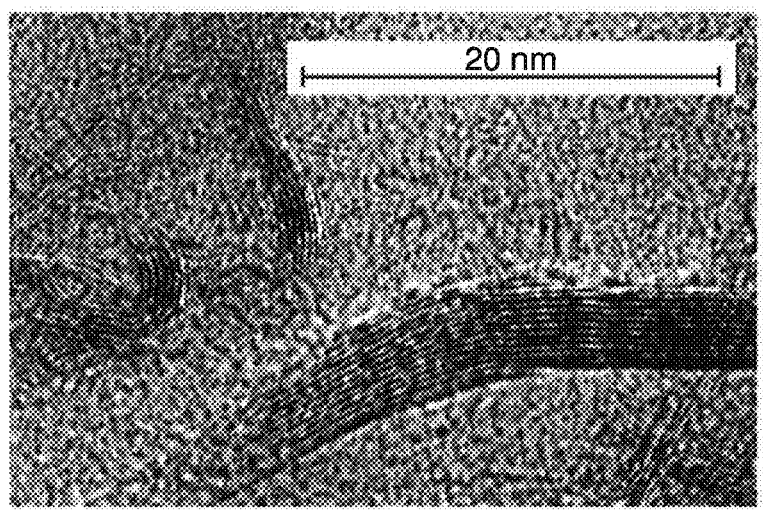

The solid material collected was 5 weight percent of the feed material, corresponding to a 5 percent yield. Raman and TEM analysis of particle morphology as illustrated in FIGS. 9-11 indicates the particles do not have a graphenic layer structure. Specifically, the Raman plot includes a non-distinct and spread-out peak in the 2692 region, and significant peaks in the 1348 and 1587 regions. As shown in the TEM images of FIGS. 10 and 11, the particles tend to be non-plate-like.

EXAMPLE 4

Example 1 was repeated, except n-butanol having the molecular structure shown below was used as the feed material (commercially available from Alfa Aesar, Ward Hill, Massachusetts).

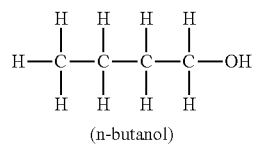
(n-butanol)

Figure 12:
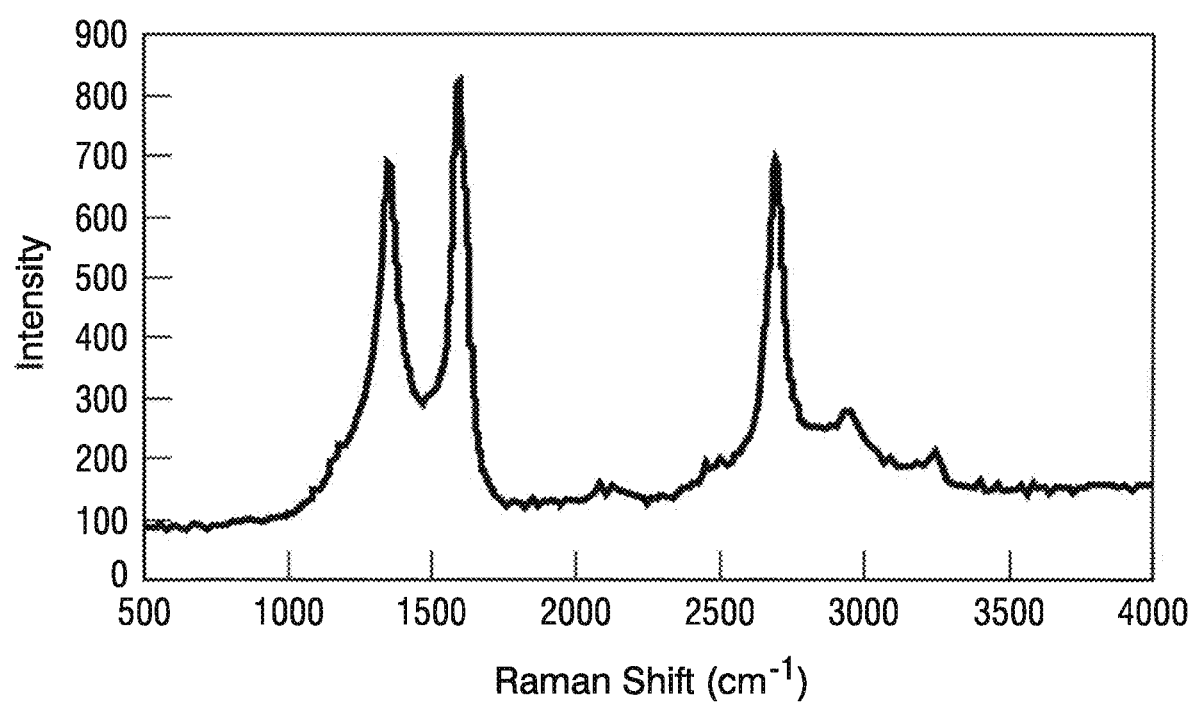
FIG. 12 is a plot of Raman shift versus reflectance for a sample of carbon particles produced from an n-butanol precursor material.
Figure 13:
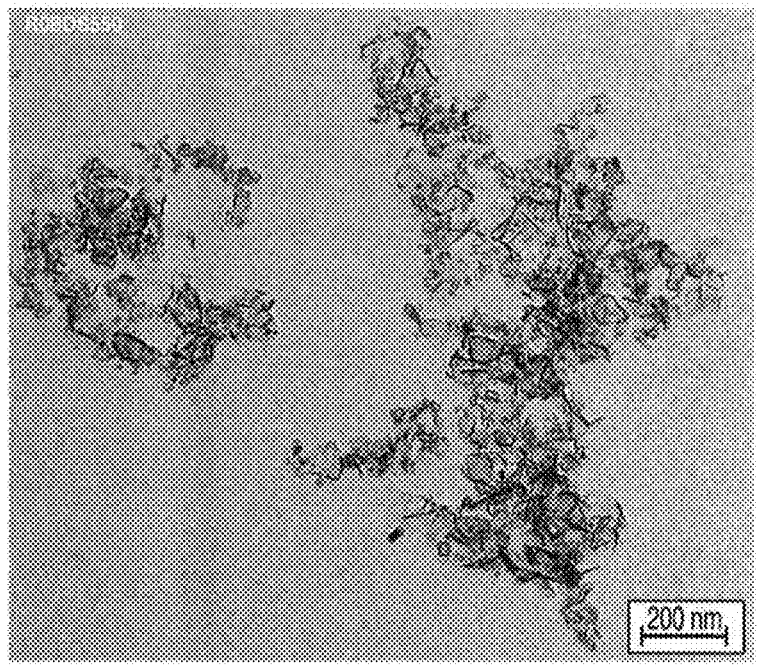
FIGS. 13 and 14 are TEM micrographs of the carbon particles corresponding to FIG. 12.
Figure 14:
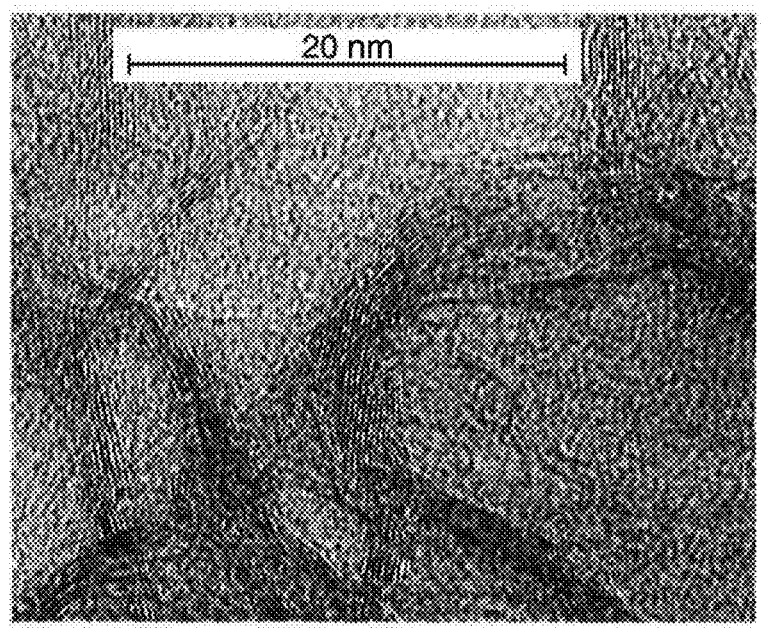

The solid material collected was 9 weight percent of the feed material, corresponding to a 9 percent yield. Raman and TEM analysis of particle morphology as shown in FIGS. 12-14 indicates that a predominantly graphenic structure is not formed, i.e., the particles comprise a mixture of crystalline spheroidal structures with graphenic layer structures.

EXAMPLE 5

Figure 15:
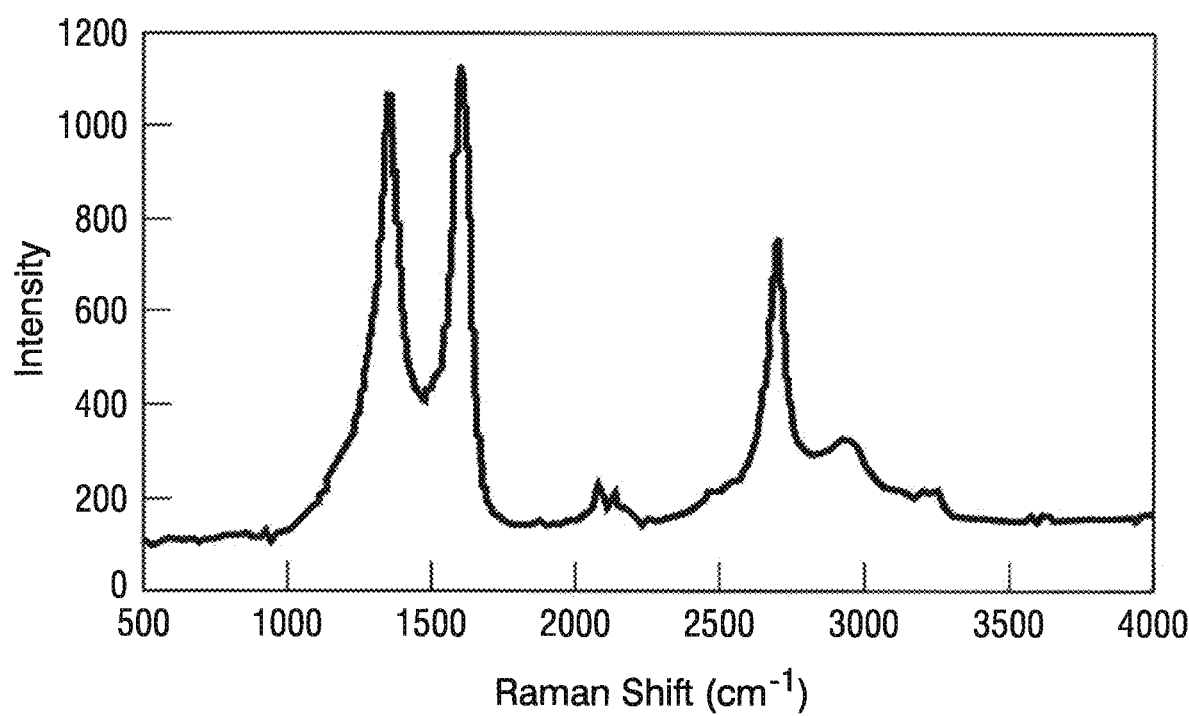
FIG. 15 is a plot of Raman shift versus reflectance for a sample of carbon particles produced from an n-pentanol precursor material.
Figure 16:
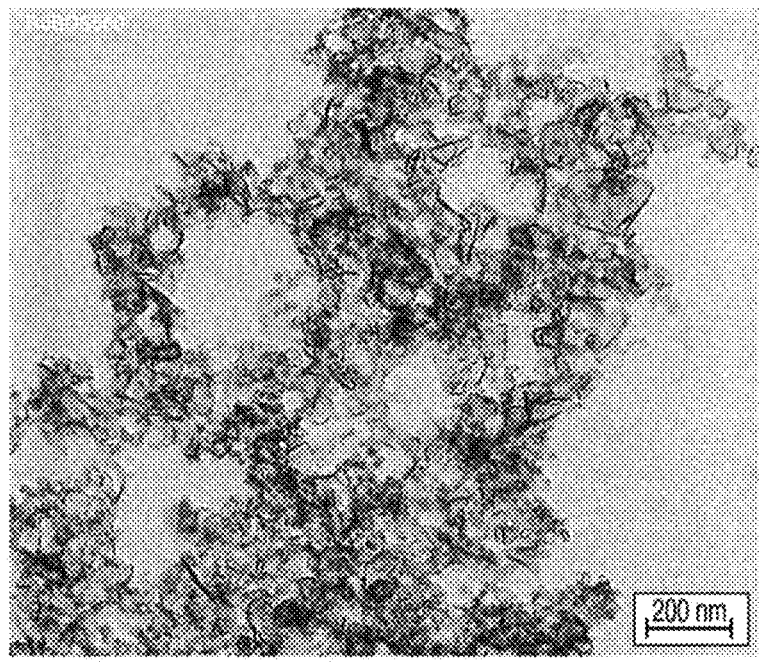
FIGS. 16 and 17 are TEM micrographs of the carbon particles corresponding to FIG. 15.
Figure 17:
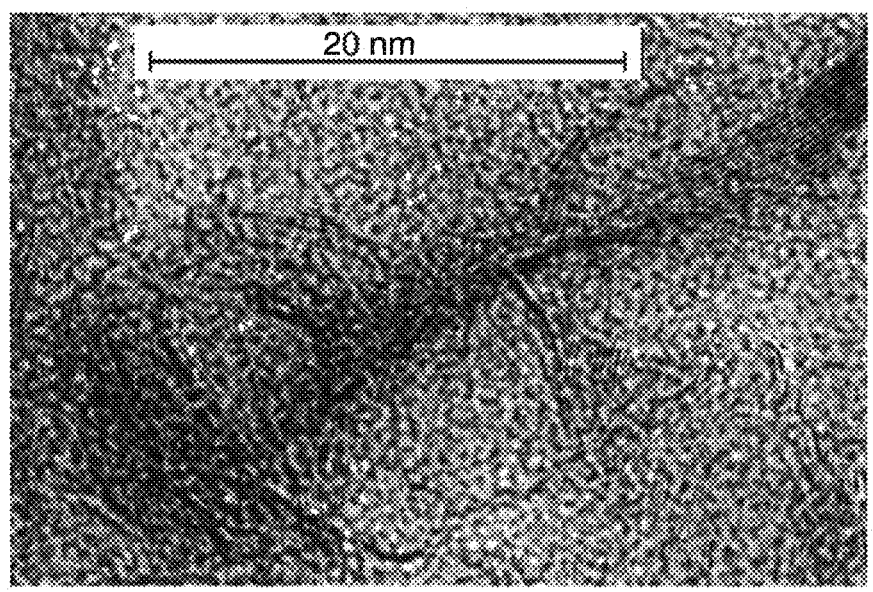

Example 1 was repeated, except n-pentanol was used as the feed material (commercially available from Alfa Aesar, Ward Hill, Massachusetts). The solid material collected was 12 weight percent of the feed material, corresponding to a 12 percent yield. Raman and TEM analysis of particle morphology as shown in FIGS. 15-17 indicates that a predominantly graphenic structure is not formed, i.e., the particles comprise a mixture of crystalline spheroidal structures with graphenic layer structures.

EXAMPLE 6

Example 1 was repeated, except diethyl ketone was used as the feed material (commercially available from Alfa Aesar, Ward Hill, Massachusetts). The solid material collected was 13 weight percent of the feed material, corresponding to a 13 percent yield. Raman and TEM analysis of particle morphology indicates that a predominantly graphenic structure is not formed, i.e., the particles comprise a mixture of crystalline spheroidal structures with graphenic layer structures.

EXAMPLE 7

Example 1 was repeated, except propargyl alcohol was used as the feed material (commercially available from Alfa Aesar, Ward Hill, Massachusetts). The solid material collected was 12 weight percent of the feed material, corresponding to a 12 percent yield. Raman and TEM analysis of particle morphology indicates the particles do not have a graphenic layer structure.

EXAMPLE 8

Figure 18:
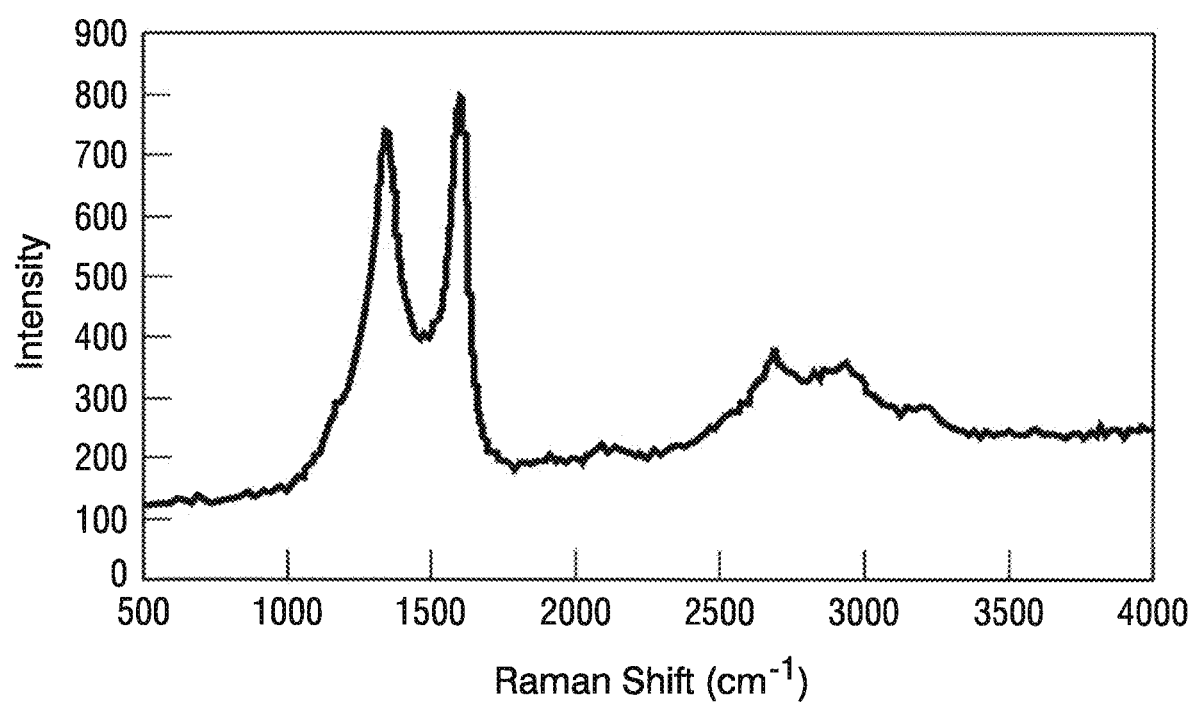
FIG. 18 is a plot of Raman shift versus reflectance for a sample of carbon particles produced from an n-hexane precursor material.
Figure 19:
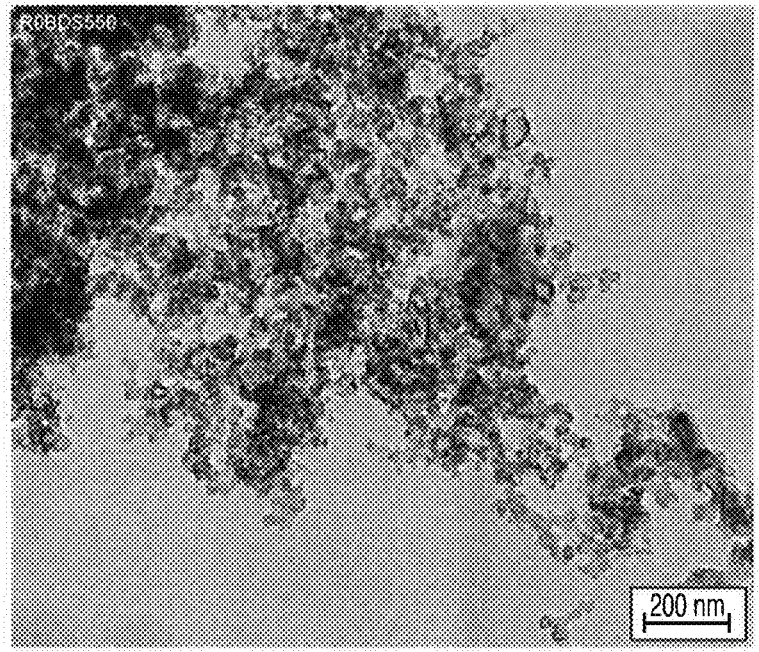
FIGS. 19 and 20 are TEM micrographs of the carbon particles corresponding to FIG. 18.
Figure 20:
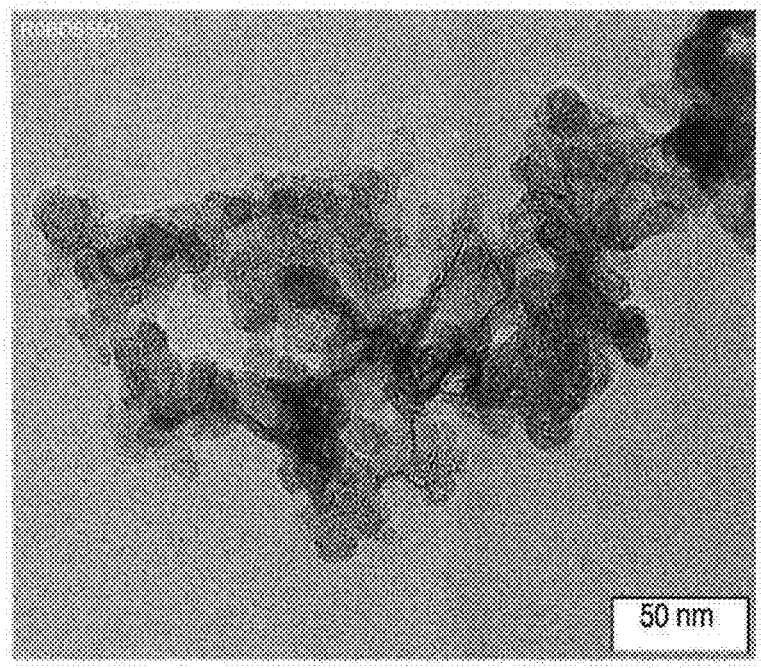

Example 1 was repeated, except n-hexane was used as the feed material (commercially available from Alfa Aesar, Ward Hill, Massachusetts). The solid material collected was 30 weight percent of the feed material, corresponding to a 30 percent yield. Raman and TEM analysis of particle morphology as shown in FIGS. 18-20 indicates the particles do not have a graphenic layer structure.

EXAMPLE 9

Example 1 was repeated, except that solid naphalene particles were used as the feed material (commercially available from Alfa Aesar, Ward Hill, Massachusetts). Raman and TEM analysis of particle morphology indicates the particles do not have a graphenic layer structure.

EXAMPLE 10

Example 1 was repeated, except benzene was used as the feed material (commercially available from Alfa Aesar, Ward Hill, Massachusetts). The solid material collected was 67 weight percent of the feed material, corresponding to a 67 percent yield. Raman and TEM analysis of particle morphology indicates the particles do not have a graphenic layer structure.

EXAMPLE 11

Figure 21:
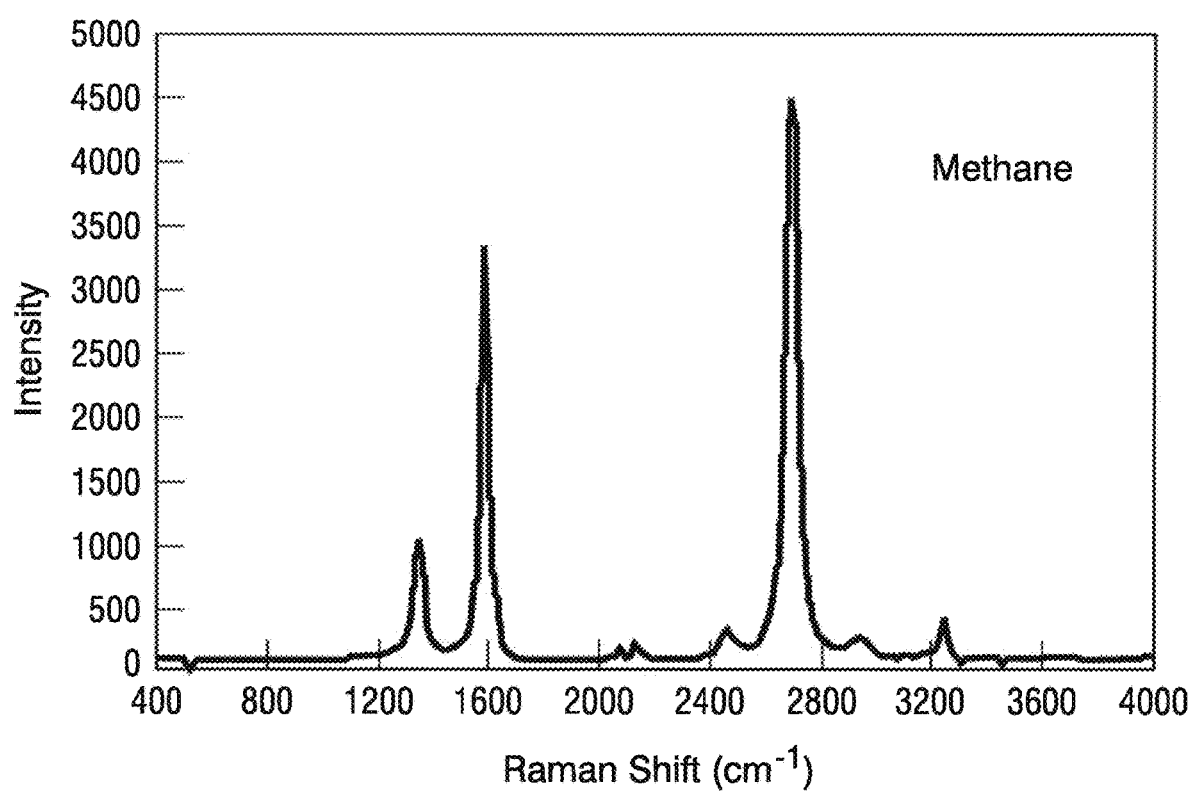
FIG. 21 is a plot of Raman shift versus reflectance for a sample of graphenic carbon particles produced from a methane precursor material in accordance with an embodiment of the present invention.
Figure 22:
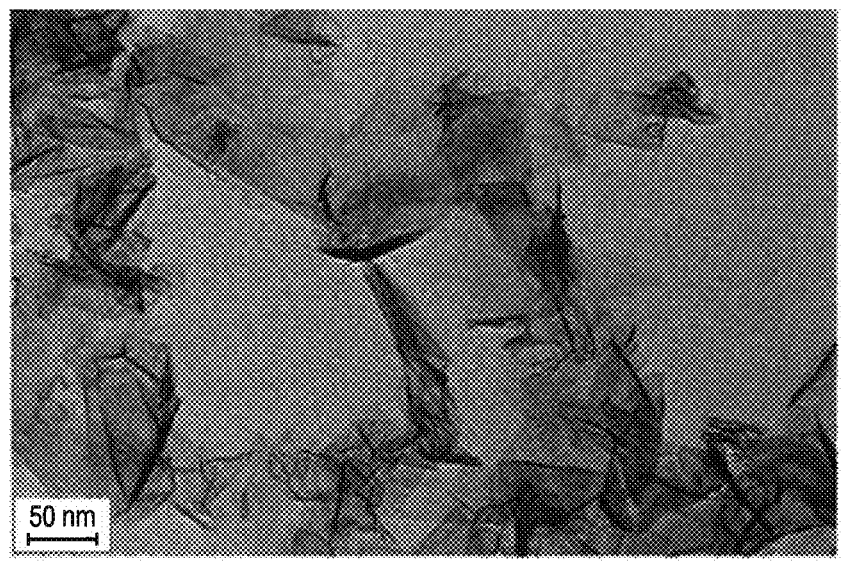
FIG. 22 is a TEM micrograph of the graphenic carbon particles corresponding to FIG. 21.

Graphenic carbon particles were produced using a DC thermal plasma reactor system similar to that shown in FIG. 2. The main reactor system included a DC plasma torch (Model SG-100 Plasma Spray Gun commercially available from Praxair Technology, Inc., Danbury, Conn.) operated with 60 standard liters per minute of argon carrier gas and 26 kilowatts of power delivered to the torch. Methane precursor gas, commercially available from Airgas Great Lakes, Independent, Ohio, was fed to the reactor at a rate of 5 standard liters per minute about 0.5 inch downstream of the plasma torch outlet. Following a 14-inch long reactor section, a plurality of quench stream injection ports were provided that included 6⅛ inch diameter nozzles located 60° apart radially. Quench argon gas was injected through the quench stream injection ports at a rate of 185 standard liters per minute. The produced particles were collected in a bag filter. The total solid material collected was 75 weight percent of the feed material, corresponding to a 100 percent carbon conversion efficiency. Analysis of particle morphology using Raman analysis and high resolution transmission electron microscopy (TEM) indicates the formation of a graphenic layer structure with average thickness of less than 3.6 nm. The Raman plot shown in FIG. 21 demonstrates that graphenic carbon particles were formed by virtue of the sharp and tall 2D peak at 2692 on the plot versus shorter peaks at the D and G 1348 and 1580 peaks. The TEM image of FIG. 22 shows the thin plate-like graphenic particles. The measured B.E.T. specific surface area of the produced material was 270 square meters per gram using a Gemini model 2360 analyzer available from Micromeritics Instrument Corp., Norcross, Georgia.

EXAMPLE 12

Figure 23:
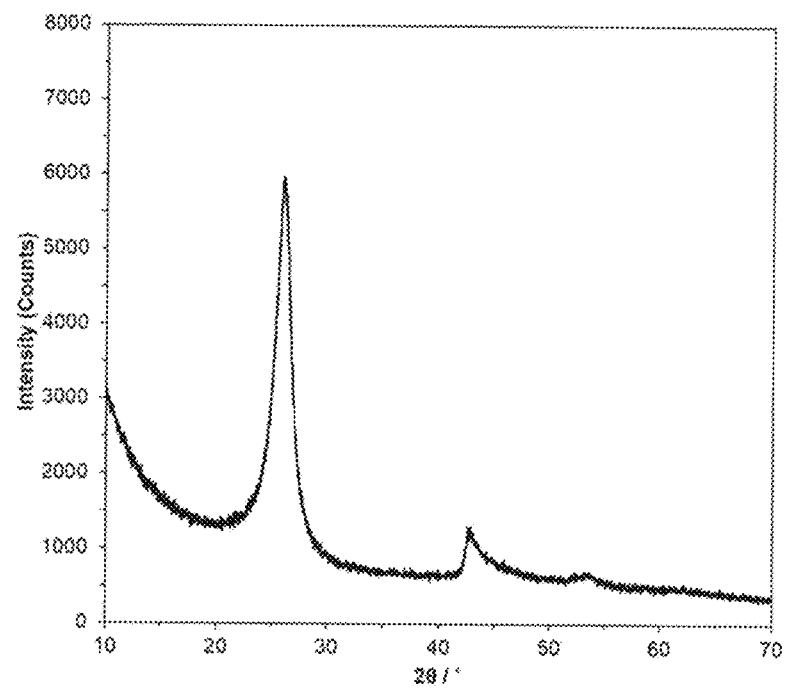
FIG. 23 is an X-ray diffraction plot for graphenic carbon particles corresponding to FIGS. 21 and 22.
Figure 24:
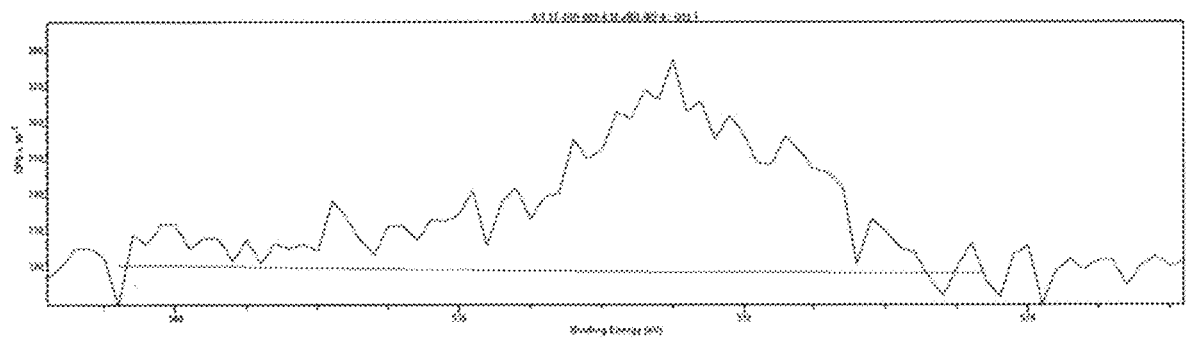
FIG. 24 is an XPS signal plot indicating oxygen content of graphenic carbon particles corresponding to FIGS. 21 and 22.

Graphenic carbon particles produced as described in Example 11 were subjected to standard X-ray diffraction testing. FIG. 23 is the resulting X-ray diffraction plot, showing a primary peak at 26.05° 2θ, which corresponds to a d-spacing of 3.42 Angstroms. The full width at half of the primary peak is 1.8°, which corresponds to a crystallite size of 4.5 nm based upon the Sherrer equation known to those skilled in the art. Such graphenic carbon particles were also subjected to standard oxygen content testing using standard XPS signal techniques. The XPS tests were performed using a Physical Electronics VersaProbe II instrument equipped with a monochromatic Al kα x-ray source (hv=1,486.7 eV) and a concentric hemispherical analyzer. FIG. 24 is the resulting XPS signal plot, demonstrating an oxygen content of 1.5 atomic percent.

EXAMPLE 13

Figure 25:
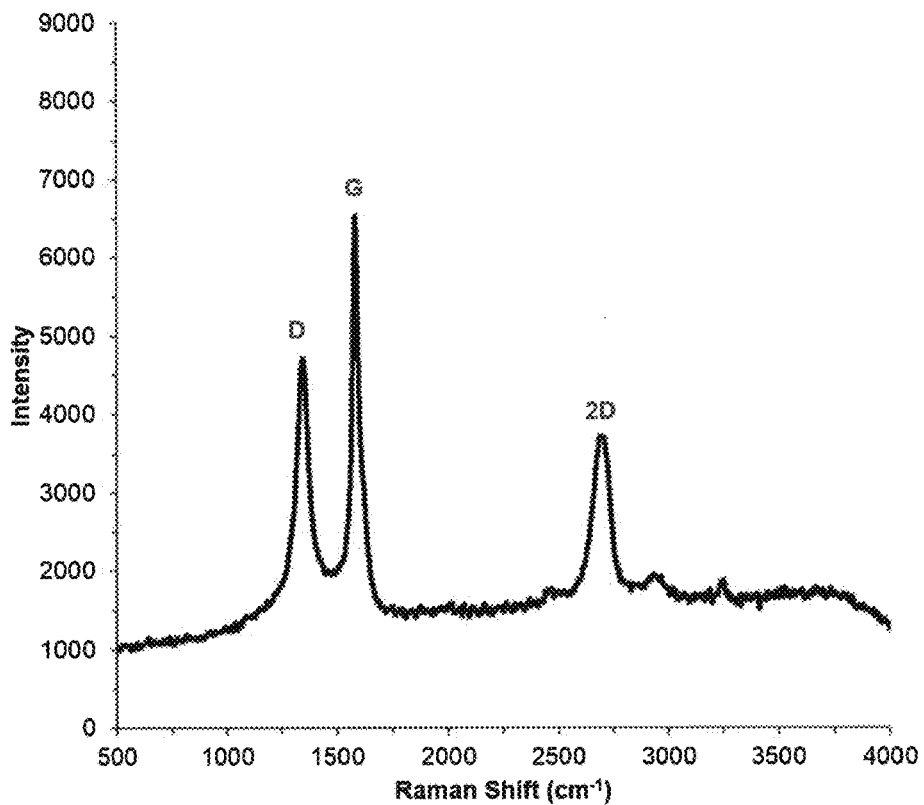
FIG. 25 is a plot of Raman shift versus reflectance for a sample of commercially available exfoliated graphene nano-platelets.
Figure 26:
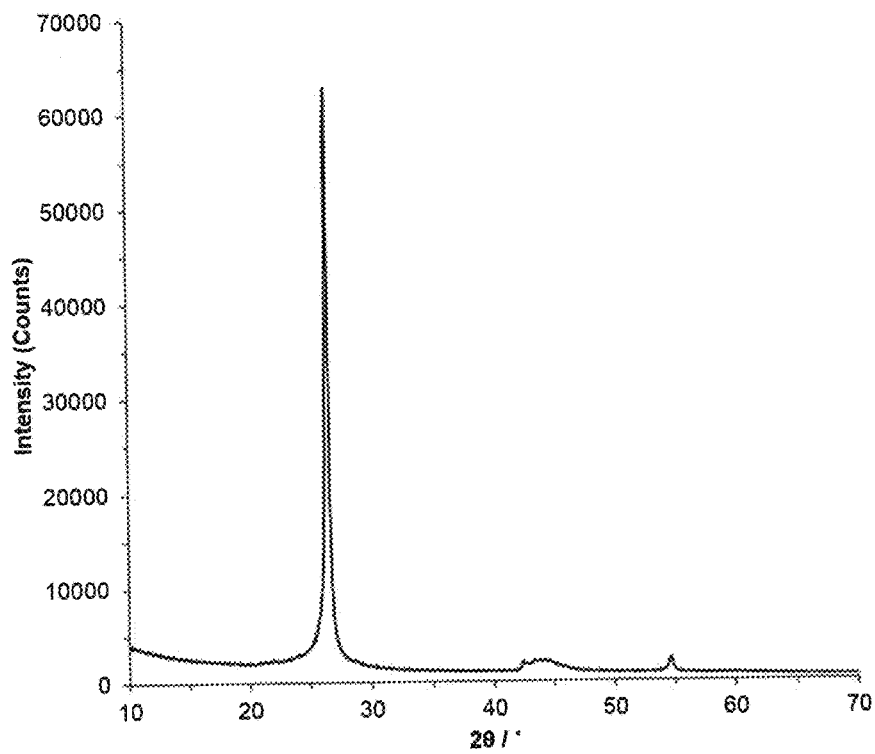
FIG. 26 is an X-ray diffraction plot for the commercially available exfoliated graphene nano-platelets of FIG. 25.
Figure 27:
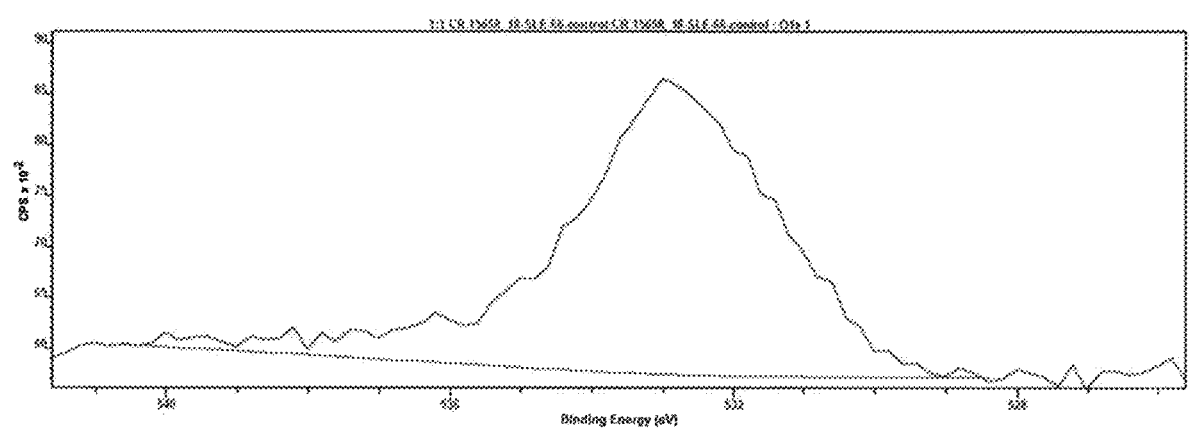
FIG. 27 is an XPS signal plot indicating oxygen content of the commercially available graphene nano-platelets of FIG. 25.

Graphene particles commercially available from XG Sciences under the designation xGNP C300 were subjected to Raman analysis, TEM analysis, X-ray diffraction testing and XPS oxygen content testing. FIG. 25 is the resulting Raman plot, FIG. 26 is the X-ray diffraction plot, and FIG. 27 is the XPS oxygen content plot. The Raman plot shows a relatively short and broad 2D peak and a relatively tall and sharp G peak for the commercially available exfoliated graphite xGNP C300 graphene nano-particles. The X-ray diffraction plot shows a primary peak at 26.4° 2θ, which corresponds to a d-spacing of 3.365 Angstroms. The full width at half the maximum primary peak is 0.264°, which corresponds to a crystallite size of 34.7 nm based on the Sherrer equation. The XPS plot demonstrates an oxygen content of 3.6 atomic percent for the xGNP C300 particles.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. Graphenic carbon particles that are thermally produced by heating a precursor material comprising methane or a hydrocarbon material capable of forming a two-carbon-fragment species in a thermal zone having a temperature of greater than 3,500° C. to form the graphenic carbon particles from the precursor material; said graphenic carbon particles having an aspect ratio of greater than 3:1, a B.E.T. specific surface area of at least 50 square meters per gram, an average of 3 or more carbon atom layers having turbostratic misalignment, and a Raman spectroscopy 2D/G peak ratio of at least 1.1:1.

2. The graphenic carbon particles of claim 1, wherein the graphenic carbon particles have an average of more than 3 carbon atom layers.

3. The graphenic carbon particles of claim 1, wherein the graphenic carbon particles have an average of more than 3.2 carbon atom layers.

4. The graphenic carbon particles of claim 1, wherein the graphenic carbon particles have an average of more than 3.5 carbon atom layers.

5. The graphenic carbon particles of claim 1, wherein the graphenic carbon particles have an average of more than 4 carbon atom layers.

6. The graphenic carbon particles of claim 1, wherein the graphenic carbon particles have an average of from 4 to 10 carbon atom layers.

7. The graphenic carbon particles of claim 1, wherein the carbon atom layers have an inter-layer spacing greater than 3.38 Angstroms.

8. The graphenic carbon particles of claim 7, wherein the inter-layer spacing is at least 3.40 Angstroms.

9. The graphenic carbon particles of claim 1, wherein the graphenic carbon particles have an average crystallite size of less than 30 nm.

10. The graphenic carbon particles of claim 9, wherein the average crystallite size is less than 10 nm.

11. The graphenic carbon particles of claim 1, wherein the graphenic carbon particles have an oxygen content of less than 3 atomic percent.

12. The graphenic carbon particles of claim 1, wherein the B.E.T. specific surface area is at least 70 square meters per gram.

13. The graphenic carbon particles of claim 1, wherein the B.E.T. specific surface area is at least 100 square meters per gram.

14. The graphenic carbon particles of claim 1, wherein at least a portion of the graphenic carbon particles are curved, curled, creased or buckled.

* * * * *